US009812126B2

(12) United States Patent
Khan et al.

(10) Patent No.: US 9,812,126 B2
(45) Date of Patent: Nov. 7, 2017

(54) DEVICE ARBITRATION FOR LISTENING DEVICES

(71) Applicant: Microsoft Technology Licensing, LLC, Redmond, WA (US)

(72) Inventors: Yaser Khan, Kirkland, WA (US); Aleksandar Uzelac, Seattle, WA (US); Daniel J. Hwang, Renton, WA (US); Sergio Paolantonio, Bellevue, WA (US); Jenny Kam, Seattle, WA (US); Vishwac Sena Kannan, Redmond, WA (US); Dennis James Mooney, II, Bellevue, WA (US); Alice Jane Bernheim Brush, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/676,647

(22) Filed: Apr. 1, 2015

(65) Prior Publication Data

US 2016/0155443 A1  Jun. 2, 2016

Related U.S. Application Data

(60) Provisional application No. 62/085,468, filed on Nov. 28, 2014.

(51) Int. Cl.
G10L 15/22 (2006.01)
G06F 1/32 (2006.01)

(52) U.S. Cl.
CPC ............ G10L 15/22 (2013.01); G06F 1/3203 (2013.01); *G10L 2015/223* (2013.01)

(58) Field of Classification Search
CPC .......................... G10L 15/22; G10L 2015/223

USPC ......................................................... 704/275
See application file for complete search history.

(56) References Cited

U.S. PATENT DOCUMENTS

| 8,340,975 B1* | 12/2012 | Rosenberger ........... G10L 15/22 704/270 |
| 8,472,931 B2 | 6/2013 | Reding et al. |
| 2004/0213212 A1* | 10/2004 | Reding .................. H04M 3/387 370/352 |
| 2006/0074658 A1* | 4/2006 | Chadha .................... G10L 17/00 704/246 |

(Continued)

FOREIGN PATENT DOCUMENTS

| WO | WO 2004049615 | 6/2004 |
| WO | WO 2014064324 | 5/2014 |

OTHER PUBLICATIONS

International Search Report and Written Opinion, from counterpart International Application No. PCT/US2015/061719, dated Feb. 25, 2016, 10 pages.

(Continued)

*Primary Examiner* — Edwin S Leland, III
(74) *Attorney, Agent, or Firm* — Klarquist Sparkman, LLP

(57) ABSTRACT

An electronic device in a topology of interconnected electronic devices can listen for a wake phrase and voice commands. The device can control when and how it responds so that a single device responds to voice commands. Per-task device preferences can be stored for a user. If a preferred device is not available, the task can still be performed on a device that has appropriate capabilities. Machine learning can determine a user's preferences. Power conservation and effective user interaction can result.

19 Claims, 12 Drawing Sheets

(56) References Cited

U.S. PATENT DOCUMENTS

| | | | | |
|---|---|---|---|---|
| 2006/0085199 | A1* | 4/2006 | Jain | G10L 15/26 704/275 |
| 2009/0043580 | A1* | 2/2009 | Mozer | G10L 15/26 704/251 |
| 2009/0183070 | A1* | 7/2009 | Robbins | H04B 1/202 715/702 |
| 2009/0204409 | A1* | 8/2009 | Mozer | G10L 15/30 704/275 |
| 2011/0230159 | A1* | 9/2011 | Hatton | G08G 1/205 455/404.1 |
| 2012/0166184 | A1* | 6/2012 | Locker | G10L 15/22 704/201 |
| 2013/0183944 | A1* | 7/2013 | Mozer | H04L 12/282 455/414.1 |
| 2013/0238326 | A1* | 9/2013 | Kim | G06F 3/167 704/231 |
| 2013/0339028 | A1* | 12/2013 | Rosner | G10L 15/222 704/275 |
| 2014/0003597 | A1* | 1/2014 | Lazaridis | H04M 3/543 379/212.01 |
| 2014/0149122 | A1* | 5/2014 | Zhang | G10L 15/22 704/275 |
| 2014/0244269 | A1* | 8/2014 | Tokutake | G10L 15/00 704/275 |
| 2014/0278435 | A1* | 9/2014 | Ganong, III | G10L 15/22 704/275 |
| 2015/0006184 | A1* | 1/2015 | Marti | G10L 25/63 704/275 |
| 2015/0312351 | A1* | 10/2015 | Wang | H04L 67/125 709/204 |
| 2016/0098305 | A1* | 4/2016 | Bucsa | H04L 65/1036 719/318 |
| 2016/0133108 | A1* | 5/2016 | Bucsa | G08B 17/11 340/629 |

OTHER PUBLICATIONS

Gillett, "The Problem with "Hey, Cortana" and Windows 10," published on Oct. 23, 2014, available at http://www.piptell.com/home/pip/4173, 5 pages.
"Earcon" Wikipedia, visited Nov. 26, 2014, 2 pages.
Jesdanun, "Cortana: Is Microsoft's voice assistant better than Siri?" *The Guardian*, Apr. 15, 2014, 4 pages.
Chin, "InstaGo: a better way to sleep," *Blogging Windows*, blogs.windows.com, Jun. 19, 2014, 5 pages.
Second Written Opinion, International Application No. PCT/US2015/061719, 5 pages, Oct. 18, 2016.
International Preliminary Report on Patentability, International Application No. PCT/US2015/061719, 6 pages, Mar. 6, 2017.

* cited by examiner

SOFTWARE 1080 IMPLEMENTING DESCRIBED TECHNOLOGIES

DEVICE ARBITRATION FOR LISTENING DEVICES

CROSS-REFERENCE TO RELATED APPLICATIONS

This application claims the benefit of U.S. patent application Ser. No. 62/085,468, filed on Nov. 28, 2014, which is incorporated herein by reference.

BACKGROUND

Electronic devices now have voice recognition functionality that can provide a variety of features in response to spoken commands. The benefits of such functionality are many. In addition, some devices now provide a digital persona who can respond to user commands or questions in a natural, conversational way. As a result, users are becoming more comfortable interacting with their devices with voice and speech, and accomplishing user tasks with speech is becoming more widespread.

Still, there are some scenarios where voice command technology falters. There remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method of controlling which electronic device out of topology of interconnected electronic devices responds to a wake phrase, the method comprising: in an electronic device of the topology of interconnected electronic devices configured to listen for voice commands, receiving a wake phrase from a microphone of the electronic device; recognizing the wake phrase; and responsive to recognizing the wake phrase, waking the electronic device and controlling which one electronic device out of the topology of interconnected electronic devices plays an audio prompt that indicates an active listening state in response to the wake phrase, wherein the controlling invokes response arbitration rules selecting a single electronic device out of the topology of interconnected electronic devices according to a user preference indicating a primary device designation for the interconnected electronic devices or recorded activity detected by one or more hardware sensors of the electronic device.

An embodiment can be implemented as an electronic device configured to recognize a wake phrase when in a low-power standby state in an environment comprising a topology of interconnected electronic devices, the electronic device comprising: a plurality of hardware sensors comprising a microphone; a speaker; a stored preference indicating a primary device designation for the topology of interconnected electronic devices; and a stored device listening state, wherein the stored device listening state transitions from the low-power standby state upon recognition of the wake phrase as received by the microphone, and wherein the electronic device is configured to control which one electronic device out of the topology of interconnected electronic devices transitions to an active listening state and plays an audio prompt that indicates the active listening state in response to the wake phrase according to the stored preference indicating the primary device designation for the interconnected electronic devices or recorded activity detected by one or more of the hardware sensors of the electronic device.

An embodiment can be implemented as one or more machine-readable media comprising computer-executable instructions that, when executed by a computing system, perform a method controlling which electronic device out of topology of interconnected electronic devices responds to a wake phrase, the method comprising: receiving a wake phrase of a virtual persona from a microphone of the electronic device; recognizing the wake phrase of the virtual persona in the electronic device; and responsive to recognizing the wake phrase of the virtual persona, waking the electronic device and controlling which one electronic device out of the topology of interconnected electronic devices plays an audio prompt that indicates a listening state in response to the wake phrase, wherein the controlling invokes arbitration rules selecting a single device out of the topology of interconnected electronic devices when a user preference indicating a primary device designation for the interconnected electronic devices indicates a primary device that is not available, based on recorded activity detected by one or more hardware sensors of the electronic device indicating that the single device is currently being used; receiving a command phrase from the microphone of the electronic device; recognizing a task in the command phrase; via a timeout, determining that a preferred device for the task is not available; responsive to determining that a preferred device for the task is not available, determining a fallback device for the task; and handing the task off to the fallback device. As described herein, a variety of other features and advantages can be incorporated into the technologies as desired.

DETAILED DESCRIPTION

Example 1—Example Overview

Figure 1:
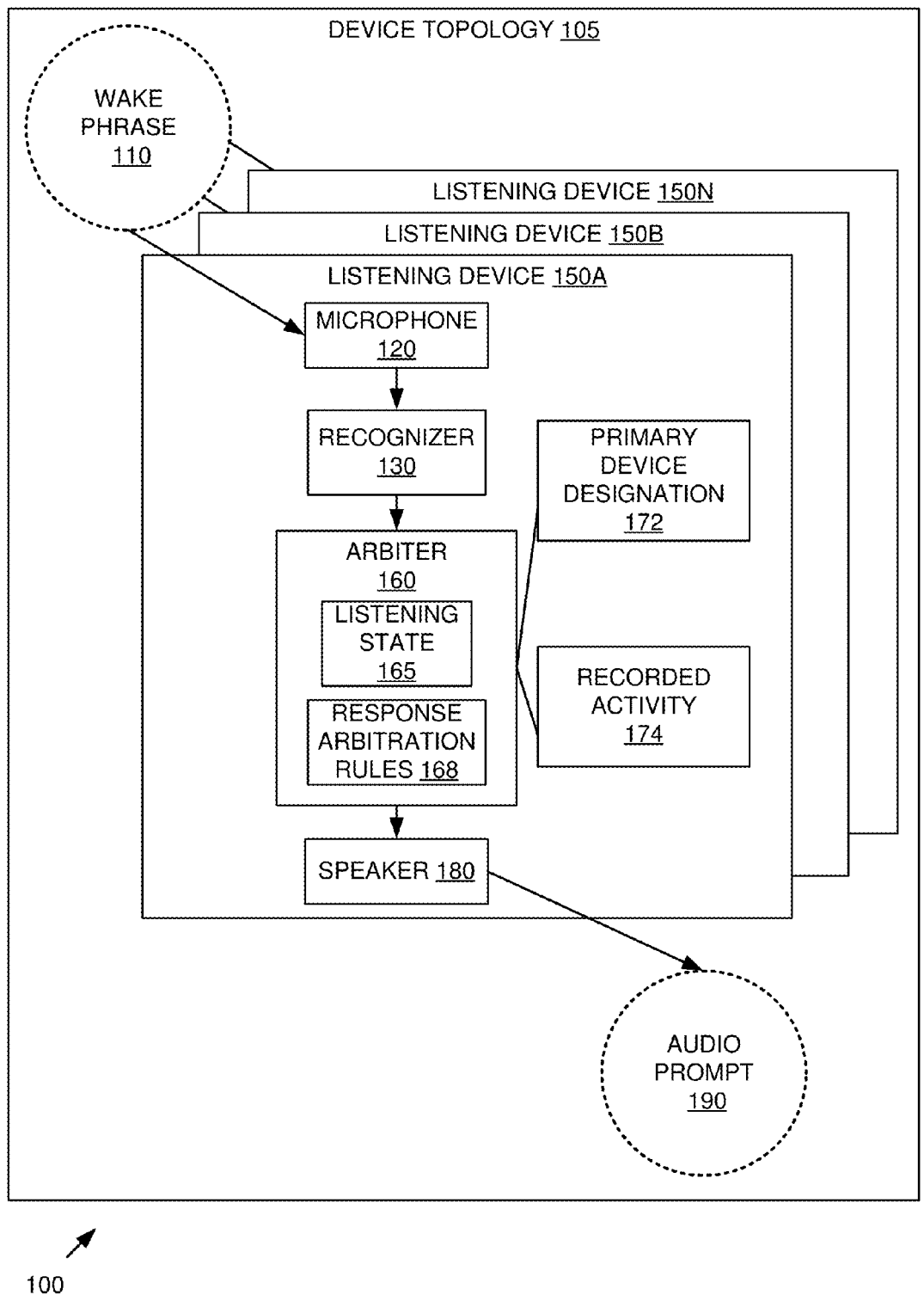
FIG. 1 is a block diagram of an example electronic device configured to control which one device plays an audio prompt in an environment comprising a topology of interconnected electronic devices.

Various embodiments herein can be used in a variety of multiple-device scenarios to address a variety of technical challenges, including power management, improved user efficiency with voice commands, increased user interaction performance, and representation of device state.

In various examples, voice activation can implement wake-on-voice functionality. A user can wake up a device in connected standby (or otherwise low-power mode) simply by uttering a wake phrase, and the device goes into a listening state for full speech recognition. However, a problem can arise when there are multiple such devices nearby when the wake phrase is uttered. In the absence of a technical solution, all of the nearby devices will wake-up (e.g., often with uneven synchronization), causing a startling or confusing experience for the user. For example, a cacophony of out-of-synch reply sounds or audio prompts can result. By application of the technologies described herein, more than one device can be listening, but only one device responds. From the user's perspective, the appropriate device responds predictably and reliably.

Similarly, controlling which of the devices actually performs a task in a voice command can be fraught with similar problems. For example, which device should perform the task? What prevents more than one device from performing the same task? Which device is most suitable to perform the requested task? For example, it may be better to use a phone for a call, but a desktop computer or other device with keyboard for an email task. If these questions are not properly addressed, undesirable or confusing outcomes can result. By application of the technologies described herein, more than one device can be listening, but only one device (e.g., the appropriate device) performs the task.

Various features herein can address these issues so that an overall superior user experience and helpful guidance to the user can result.

Various other features can be implemented and combined as described herein.

Example 2—Example Efficient User Interface with Devices and Other Effects

The technologies herein can result in an efficient user interface with devices. In addition to the benefits of a natural user interface in which a user can simply speak a command, the technologies can avoid confusion, duplication, and misdirection in multi-device scenarios. For example, a user can specify a preferred device one time instead of having to repeatedly explicitly specify the device by name.

Use of a wake phrase as described herein relieves the user from having to walk over to a device and press a button to start speech interaction.

Further, the technologies can support preferences at the level of task granularity. Different preferred devices can be set for different tasks. For example, a user may prefer for video to be presented on a particular device, and the technologies can respect the user's desire. However, if the preferred device is not available, the task can still be performed on a secondary device that has the capability to perform the task. The technologies thus relieve the user of having to track a complex matrix of what device can do what.

In other scenarios, a user can efficiently interact with devices in that a preferred device can present a virtual persona, but device arbitration can select a device that has the capabilities to perform a desired task. For example, a user may prefer to interact with a particular device on an ongoing basis. However, the user then enters a room with a set of other devices that have more capabilities. The devices can remain in a standby mode until a user requests functionality that the preferred device cannot achieve. The preferred device can continue to interact but then wake the other device and hand the task off to the other device.

Finally, power can be conserved because unused devices can remain in standby mode for much of the time.

Example 3—Example System Implementing Technologies

FIG. 1 is a block diagram of an example electronic device 150A configured to control which one device plays an audio prompt 190 when recognizing a wake phrase 110 in an environment comprising a topology 105 of interconnected electronic devices 150A-N. In the example, the electronic devices 150A-N have listening (e.g., voice recognition) capabilities, but the topology 105 can also include one or more devices without voice recognition.

In the example, the electronic device 150A comprises a microphone 120, a speaker 180, and a plurality of other hardware sensors. A microphone of the electronic device 150A can be an internal or integral part of the device 150A or can be an external source (e.g., USB microphone or the like). A stored preference indicating a primary device designation 172 for the topology 105 of interconnected electronic devices 150A-N can also be included along with recorded activity 174 (e.g., of the hardware sensors as described herein).

The device 150A can also include a stored device listening state 165 that transitions from a low-power standby state upon recognition by the recognizer 130 of the wake phrase 110 received by the microphone 120.

The device 150 can control which one electronic device out of the topology 105 of interconnected electronic devices 150A-N transitions to an active listening state and plays an audio prompt 190 that indicates the active listening state in response to the wake phrase 110 according to the stored preference indicating the primary device designation 172 for the interconnected electronic devices or recorded activity 174 detected by the one or more of the hardware sensors of the electronic device 150A.

An arbiter 160 can provide an arbitration service and consult response arbitration rules 168 to achieve control over which device responds. As described herein, such rules 168 can include rules of succession (e.g., a fallback list) when a primary device is not available. A listening state 165 can indicate whether the device is in a standby, active, active listening, or other state as described herein.

As described herein, the device 150A itself may not respond and instead remain silent. In this way, a single device can respond, leading to reduced power consumption and a smoother user interaction with the device topology 105.

Although various components are shown in separate boxes, in practice, component boundaries may vary. For example, the components can be provided as part of a device operating system, application, appliance, or the like. Other arrangements are possible while still implementing the technologies. For example, the listening state 165 can be split into multiple locations instead of or in addition to the one shown as being within the arbiter 160, and the like.

In practice, the systems shown herein, such as system 100, can be more complicated, with additional functionality, more inputs, outputs, and the like. In practice, additional functionality related to location (e.g., GPS, indoor positioning technology, or the like) can be included to determine a current location of a device that hears a spoken command.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, rules, and states can be stored in one or more computer-readable storage media or computer-readable storage devices. The technologies described herein can be generic to the specifics of operating systems or hardware and can be applied in any variety of environments to take advantage of the described features.

Example 4—Example Method Implementing Technologies

Figure 2:
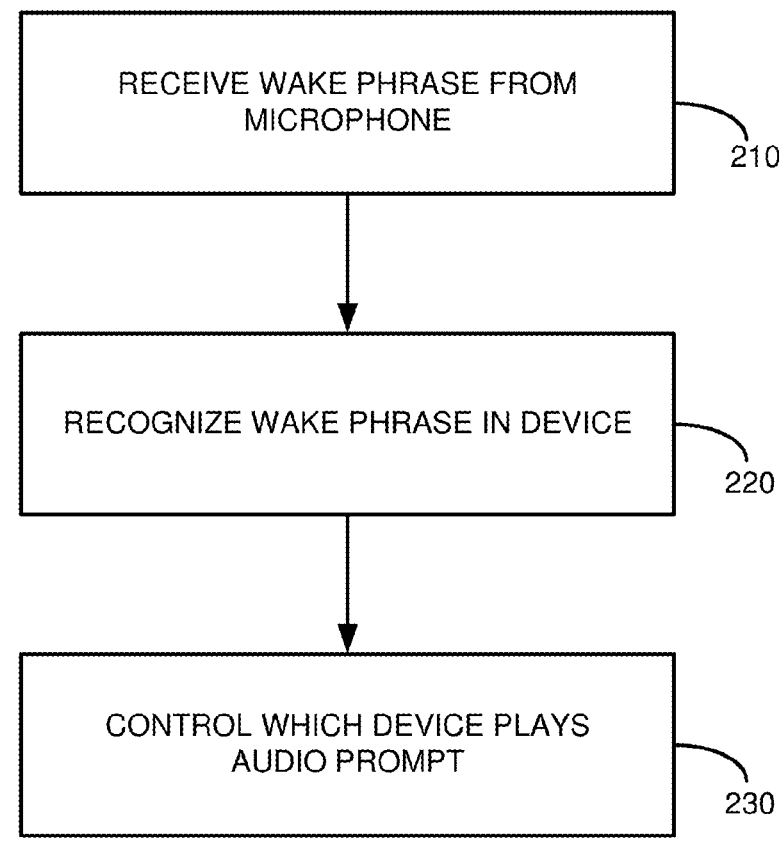
FIG. 2 is a flowchart of an example method of controlling which device out of a topology of interconnected electronic devices responds to a wake phrase.

FIG. 2 is a flowchart of an example method 200 of controlling which electronic device out of topology of interconnected electronic devices responds to a wake phrase and can be implemented, for example, in the system shown in FIG. 1. The topology of interconnected electronic devices can be any combination of electronic devices described herein. Such devices can independently run the described method to cooperatively control which device responds.

At 210, a wake phrase is received from a microphone of the electronic device.

At 220, the wake phrase is recognized in the device. As described herein, such recognition can be performed by a main listening subsystem or an auxiliary listening subsystem.

At 230, responsive to recognizing the wake phrase, the device wakes (e.g., it wakes itself) and controls which one electronic device out of the topology of interconnected electronic devices plays an audio prompt that indicates an active listening state in response to the wake phrase. The device that does respond transitions into an active listening state as described herein.

Controlling which device responds can invoke arbitration rules selecting a single device out of the topology according to a user preference indicating a primary device designation for the interconnected electronic devices or recorded activity detected by one or more hardware sensors of the electronic device.

The single device that is selected can then sound the audio prompt. The other devices can remain silent (e.g., not sound the audio prompt), even if they are performing the method 200 (e.g., in parallel with the other devices).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed at least in part by any of the computing systems described herein (e.g., a mobile device, mobile computing device, game console, wearable computing device, another listening device, or the like).

Example 5—Example Wake Phrase

In any of the examples herein, a wake phrase can be used to wake a listening device. Such a phrase can be in the form of a salutation, name of a virtual persona, or both. For example, "Hey <persona name>," "<persona name>," or the like can be used. Some examples use a wake phrase for a virtual persona (e.g., "Hey Cortana") for the sake of illustration, but the actual wake phrase can be changed without impacting the technologies as described herein.

When in a low-power listening mode (e.g., connected standby state), the hardware can accomplish recognition of the wake phrase with reduced resources because the wake phrase is known in advance and full recognition need not yet be activated. A limited number of wake phrases beyond a single wake phrase can be supported in such instances.

Because the wake phrase triggers arbitration, it is sometimes called a "trigger phrase"; it is also sometimes called a "keyword phrase." The wake phrase can be for a virtual persona (e.g., in a system that supports multiple wake phrases).

The technologies herein can be applied to scenarios where one or more devices are not in a connected standby state. For example, a user can be actively using or engaged with a device when the wake phrase is uttered, while other nearby devices are in connected standby. In such a case, the arbitration can pick a single device (e.g., most likely the device the user is actively using or engaged with).

An additional voice recognition feature can be used in conjunction with the wake phrase in that the system can be configured to only respond when the wake phrase is spoken by an authorized user (e.g., a user who is authorized on the listening device). Thus, user identification can be performed on the wake phrase (e.g., based on phonetically rich data collected during an enrollment phase, during daily use, or the like). In practice, additional layers of authentication for some actions or tasks can be required, but it can be useful to have user-specific recognition, especially when there are groups of devices being used by groups of people in the same location.

Additional user identification features can be used in combination with the wake phrase (e.g., a visual sensor can perform face recognition, skeletal recognition, or the like).

Example 6—Example Command Phrase

In any of the examples herein, a microphone can receive a command phrase spoken by a user. Such a command phrase can include a task (e.g., task name), device (e.g., device name), or both. The task can be recognized and then performed or handed off to be performed as described herein. Similarly, the device can be recognized, and the task performed (e.g., if the current device is the one named) or handed off to the device that is explicitly named.

As described herein, the arbitration process can choose an appropriate device on which to perform the task.

As described herein, a turn-by-turn dialog can be supported where by the task phrase is divided in an exchange. For example, a first command phrase may say to do "something" on a named device. The virtual persona can then respond by asking what to so. The second command phrase can be simply "play music," at which point the named device plays music.

Example 7—Example Explicit Device

In any of the examples herein, a command phrase can include a device (e.g., device name) and thereby explicitly request that a task be performed on the specified device. For example, "Send email to Bob on laptop," can result in the laptop computer responding and starting the email. The explicit device need not have voice recognition or listening capability; it can receive a handoff as described herein.

In the case where no device is specified (e.g., "Send email to Bob"), if the initial device chosen by the system is incorrect (e.g., a desktop machine), a corrective utterance (e.g., "No, on my laptop," "can we do this on my laptop?" or the like) can explicitly transfer the task to the specified device, to which the context is transferred (e.g., the user can continue typing the email to Bob). Such an utterance can be treated as an explicit utterance for purposes of machine learning or the like.

Example 8—Example Virtual Persona

In any of the examples herein, the technologies can implement a virtual software-based entity whom a user is able to engage from a set of devices to help accomplish a given task (e.g., send an email to someone, call someone in their address book, etc.). Such a virtual persona can encourage users to interact with electronic devices in a natural way, leading to a more relaxed voice and therefore more efficient user interaction.

Because a virtual persona system can help a user accomplish tasks, it is sometimes called a "digital personal assistant system."

By leveraging the technologies described herein, the user can be given the impression that the virtual persona is ubiquitous (e.g., is in many devices).

Example 9—Example Stored Device Listening State

In any of the examples herein, a device can store a device listening state (or simply "state") that allows the arbitration technologies to function smoothly across multiple devices. A low-power connected standby state can be supported in which the device is listening for the wake phrase, thereby conserving power. The device can transition from the low-power, connected standby state to an active listening state as described herein. Various other states can be supported as described herein.

In some of the examples herein, a starting state is described as a low-power or connected standby state. In practice, the arbitration process can be applied to any number of states, such as "awake and locked," "active," and the like. For example, a device can be fully active and unlocked and still respond to the wake phrase and start the arbitration process described herein. Locked devices can respect task restrictions but still perform above-the-lock functionality (e.g., weather or the like).

When implemented, the state can be split into multiple locations within the device. For example, a low-power auxiliary processor may store a state in conjunction with a state stored by a main processor that together make up the device's listening state.

Example 10—Example Voice Recognition

In any of the examples herein, a variety of voice recognition technologies can be applied. Although voice recognition can be performed in the device as shown in some examples, an external recognizer can also be employed as appropriate.

In addition to voice recognition, voice authentication can also be performed to prevent a device from respond to an unauthorized user. Such authentication can be helpful in a multiple-speaking-user, multiple device environment.

Example 11—Example Low Power or Connected Standby State

The technologies described herein can conserve power by implementing a low-power state that is sometimes called "connected standby" herein. However, in practice, the state may be called something other than "connected standby." Because the device is listening for a very limited number of keywords or one utterance (e.g., a wake phrase), a lower-power consumption implementation can successfully recognize the wake phrase and respond to the user.

As described herein, an auxiliary voice recognition subsystem (e.g., with auxiliary processor or other circuitry) can be employed to achieve initial voice recognition of the wake phrase. So-called "full" recognition can be performed by a main voice recognition subsystem after the device wakes.

For the methods herein, some parts can be performed by an auxiliary subsystem (e.g., with an auxiliary processor or other circuitry), while other parts are performed by a main voice recognition subsystem (e.g., using a main processor or other circuitry). For example, recognizing a wake phrase can be performed by an auxiliary voice recognition subsystem of a listening device while the device is in a standby (e.g., connected standby) state. Meanwhile, controlling which device transitions to an active listening state and plays an audio prompt can be performed by a main voice recognition subsystem of the device after the device has transitioned out of the standby state (e.g., it wakes up).

After transitioning out of the standby state, the device can be in a non-standby (e.g., active, actively listening, or the like) state. Waking the device can thus activate the main processor from an inactive state.

The main voice recognition subsystem can be placed in inactive, standby, or sleep mode when the device is in the described connected standby state (e.g., the CPU is not running, but some peripherals are running that consume only a fraction of the power that would be if the CPU were running) Therefore, less power is consumed by the device when in the standby state, but it is still able to recognize the wake phrase. In this way, an always-listening experience can be provided across multiple devices even if all the devices are not always actively listening for commands.

A system that implements such a lower power or connected standby listening state is sometimes called an "always-listening" device or a device with "always-listening" capability. In practice, the device need not be always listening. For example, a user can manually turn off the listening capability, or listening can be disabled or stopped for other reasons.

Example 12—Example Control of which Device Transitions and Plays Audio Prompt In any of the examples herein, response arbitration can be performed to control which device transitions to an active listening state and plays an audio prompt. Response arbitration is a form of device arbitration in that a single device is chosen to respond. A determination of which device responds can be accomplished via the techniques described herein (e.g., based on user preferences, recorded activity, or the like). Control can be based on evaluation of criteria by response arbitration rules as described herein.

Example 13—Example Audio Prompt

In any of the examples herein, a device can sound an audio prompt to indicate that it is in an active listening state. Such an audio prompt can take the form of one or more tones, a greeting (e.g., "Hi! How can I help you?") or the like. Such an audio prompt is sometimes called an "earcon" or "earcon sound."

Alternatively, a visual prompt (e.g., text, flash, change in screen color or background, or the like) can be used in addition to or in place of an audio prompt.

In some cases, it may be desirable to omit the prompt (e.g., the action is performed without a prompt).

Example 14—Example Interconnected Electronic Devices

In any of the examples herein, the devices can be interconnected in a variety of ways. The connected devices are sometimes called a "topology" of devices because the number and kinds of devices can influence operation and performance of the collective system. Such devices can be connected in a variety of ways (e.g., via a wireless network, via wired network, or the like). The devices in the topology need not all be listening or even able to listen. For example, one device can hand off a task to another device.

The devices can be connected to the Internet and communicate over the Internet; however, the technologies can work without an Internet connection. For example, communication can take place over a local network, private network, ad-hoc network, or the like. A device can broadcast messages to other devices on the same network. An ad-hoc (e.g., private) wireless network can be used to communicate even if there is no formal network in place. Devices can determine whether they are within a certain proximity of each other, and such technology can also be used to interconnect the devices.

In practice, the devices can be limited to those that are registered with a service provider or service provider group. If so, the interconnected devices can be limited to those that are registered to a same account (e.g., username). Devices that are not so registered can be excluded from responding. In this way, one user's devices can broadcast messages, but those devices registered to a different user will not respond.

Example 15—Example Network Types

In any of the examples herein, the technology implemented to connect the devices can vary. Any of a variety of wireless or wired technologies can be used.

For example, devices can communicate directly with a server over TCP/IP, HTTP, or the like. Windows Push Notification Services or similar services can be used to communicate between devices, wake devices, or the like.

A Wi-Fi Direct service (WiFiDS) can be used so that devices can communicate even if they are not on the same network, there is no network (e.g., in a public space), or the like. Simple Search and Discover Protocol (SSDP) can be used to detect devices on the same access point (e.g., same subnet). For example, such an approach can be used if a device does not meet the hardware, driver, and/or software prerequisites for WiFiDS. Near Field Communication (NFC) is typically employed through radio communication and can also be used. It is expected that other and future-developed technologies can be used to accomplish communication between and among the devices as described herein.

Example 16—Example Recorded Activity

In any of the examples herein, a device can record physical activity. Such recorded activity can then be used for device arbitration to select a single device to respond to the user, perform a task, or the like. Such activity can be derived from hardware sensors. For example, physical movement of a device, activity at a touchscreen, keyboard, pointing device, movement visually detected, user visual (e.g., face, skeletal, etc.) recognition, or the like. Hardware other than the microphone can be used, but a microphone can also collect activity (e.g., sound detected).

Such recorded activity can include a timestamp to allow choice of most recent activity or device currently being used as described herein.

Example 17—Example System Implementing Technologies

Figure 3:
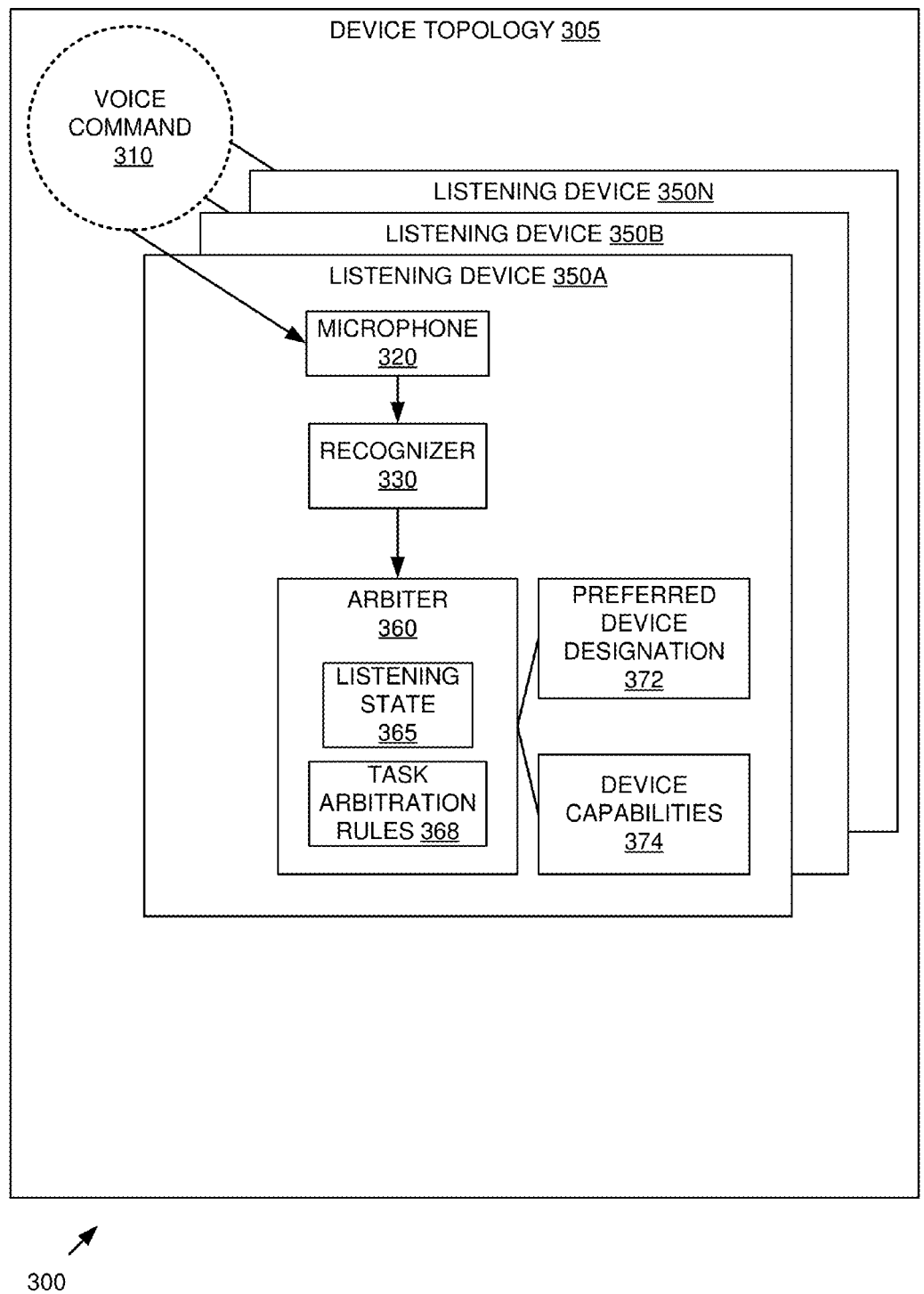
FIG. 3 is a diagram of an example electronic device configured to control which one electronic device performs a recognized task.

FIG. 3 is a block diagram of an example electronic device 350A configured to recognize a voice command 310 in an environment comprising a topology 305 of interconnected electronic devices 350A-N. In the example, the electronic devices 350A-N have listening (e.g., voice recognition) capabilities, but the topology 305 can also include one or more devices without voice recognition.

In the example, the voice recognizer 330 is configured to recognize a voice command 310 received by the microphone 320 of the electronic device 350A. The voice command 310 can comprise a task (e.g., a task name), device (e.g., device name), or both as described herein. Other voice interactions are possible. For example, a voice command can be assembled via multiple utterances, or other situations not strictly meeting specified criteria can be processed (e.g., so an audio response of "Sorry, I don't understand" can be presented).

An arbiter 360 is configured to control which one electronic device out of the topology of interconnected electronic devices 350A-N performs the task according to a user preference 372 or capabilities 374 of the interconnected electronic devices 350A-N.

The user preferences 372 can indicate a user device preference (e.g., for a particular task or scenario) as described herein. Machine learning can be applied to set such preferences 372 as described herein.

The arbiter 360 can include a listening state 365 and task arbitration rules 368. The task arbitration rules 368 can specify rules of succession (e.g., a fallback list) when a preferred device is not available.

Some of the components in FIG. 3 can be shared with those shown in FIG. 1. For example, the same microphone 320 can be used. As described herein, the voice recognizer 330 can be engaged in a full listening mode that is able to recognize spoken tasks in contrast to the low-power, connected standby mode as described herein. For example, the device 350A has transitioned to an active listening state 365 (e.g., after recognizing a wake phrase). Therefore, the recognizer 330 may be a voice recognizer with extended functionality as compared to that of FIG. 1. It can, in fact, be implemented by different circuitry if desired. The arbiter 360 can be shared with that shown in FIG. 1, as can the listening state 365.

Thus, the system of FIG. 1 can further comprise a voice recognizer 330 configured to recognize a voice command 310 received by the microphone 320 of the electronic device 350A (which can be the same device as 150A shown in FIG. 1) and a task arbiter 360 configured to control which one electronic device out of the topology of interconnected electronic devices performs the task according to user preference or capabilities of the interconnected electronic devices.

Example 18—Example Method Implementing Technologies

Figure 4:
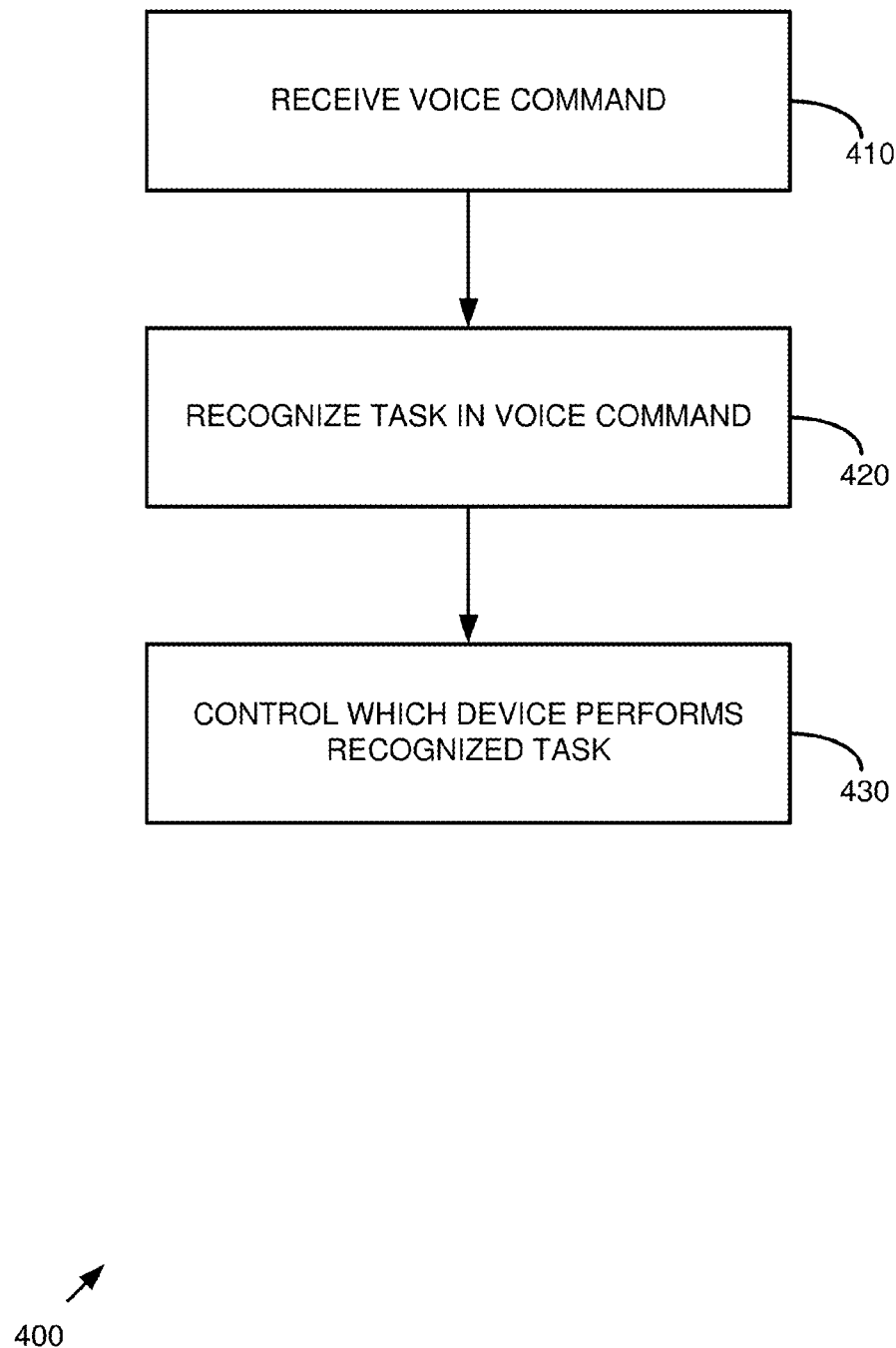
FIG. 4 is a flowchart of an example method of controlling which device out of a topology of interconnected electronic devices performs a recognized task.

FIG. 4 is a flowchart of an example method 400 of controlling which electronic device out of topology of interconnected electronic devices performs a recognized task and can be implemented, for example, in the system shown in FIG. 3. The method 400 can be performed independently or in conjunction with that shown for response arbitration in FIG. 2 (e.g., with components from those shown in FIG. 1).

The topology of interconnected electronic devices can be any combination of electronic devices described herein. Such devices can independently run the described method to cooperatively control which device performs the task.

At 410, a voice command is received with a microphone of the electronic device.

At 420, a task in the voice command is recognized. In practice, due to the rich functionality supported by such recognition, it is typically performed by a main listening subsystem of the electronic device (e.g., the device is in an active listening state). An external recognizer can be used as described herein.

At 430, responsive to recognizing the task, the electronic device controls which one electronic device out of the topology of interconnected electronic devices performs the recognized task in response to the voice command. Controlling which device performs the recognized task can invoke arbitration rules that select a single electronic device according to user device preference or capabilities of the interconnected devices.

The selected one electronic device can then perform the task. The other devices can do nothing (e.g., not perform the task), even if they are performing the method 400 (e.g., in parallel with the other devices).

In any of the examples herein, task arbitration can be performed to control which device performs the recognized task. Task arbitration is a form of device arbitration in that a single device is chosen to perform the task. Control can be based on evaluation of criteria by task arbitration rules as described herein.

For example, if a preferred device for a recognized task is not available (e.g., as determined by maintaining an available devices list, using a timeout, or the like), a fallback device can be chosen.

The device can handoff the task to another electronic device as described herein. In such a case, the device can then eventually transition back to a standby, low-power state.

Example 19—Example Tasks

In any of the examples herein, a command phrase can comprise one or more tasks that can be recognized by the voice recognition technology and then performed on behalf of the user. Tasks can have associated task names that can be chosen as familiar to a user (e.g., "play music," "call Mom," "Send an email to Jim," "turn on the kitchen lights," or the like). As shown, a task can include parameters that are included as part of the spoken command phrase. A task is sometimes called a "command" herein.

Any of a variety of tasks are possible, including playing music, sending email, placing phone calls, sending text messages, setting reminders, setting alarms, setting calendar items, or the like.

When performing a task, an audio indication can be given (e.g., in the voice of the virtual persona). For example, a phrase such as "OK, playing music" can be sounded. Thus, the user realizes that the task was recognized and is about to be performed, leading to smoother interaction between the user and the devices.

Example 20—Example Task Domains

In any of the examples herein, tasks can be grouped into task domains. For example, tasks related to music can be grouped into a music domain, tasks related to email can be grouped into an email domain, or the like. Response preferences and behavior can be made consistent within a domain. For example, if a user wishes to set a preferred device for a particular task, such a preference can carry across to other tasks in the same domain.

Example 21—Example Devices

In any of the examples herein, a variety of devices can be supported. In practice, a device can be specified as part of a command phrase. For purposes of differentiating devices, they can have device names that are spoken as part of a command phrase. For example, generic device names can be used (e.g., "Play music on my phone.") or the devices can have names (e.g., "Play music on Jimmie's phone").

The technologies can support a rich mix of device types that can be present in a device topology of a user. For example, phones, tablets, game consoles, wearable computers, desktop, laptop, and the like can be supported.

Example 22—Example Preferred Device Designation

In any of the examples herein, a device can store an association of tasks with preferred devices. Thus, a preferred device is associated with a respective task or group of tasks. For example, an association between a play music task and a phone indicates that the phone is the preferred device for playing music.

The association can be based on user device preference of which device is to be used for which task. In practice, defaults can be set up based on the perceived topology. For example, for a user who has only two devices of certain types, a certain preference profile can be implemented.

A user can modify the preferred device designation via a settings graphical user interface or by voice command (e.g., "always play music on my phone," "make my phone the default to play music," or the like).

When a task is recognized, it can then be performed at the preferred device if available as described herein. For example, a primary device that performs recognition of the command phrase that is not the preferred device can hand the task off to the preferred device.

Further, if the preferred device is not available, a device that nevertheless has the capability to perform the task can still be selected within the topology of interconnected devices. In this way, the user can still accomplish the task, even if the preferred device is not available for whatever reason.

Example 23—Example Machine Learning

Machine learning can be used to set preferred device designations. For example, if a user consistently and repeatedly explicitly specifies a particular device for a task, the device can be set as the preferred device for the task. For example, specifying a device n (e.g., 5 or the like) times in a row can lead to its being set as the default. Or, a prompt can then be presented by which the user can confirm that it is to be the default. (e.g., "Would you like your phone to be the default for playing music?"). The user can also be informed that the setting has been made (e.g., "OK. I'm setting your phone to play music. In the future, you can just say 'Play music.'").

Thus, the system can recognize repeated, consistent usage of a particular device for a particular task. Responsive to recognizing such usage, the user preference to indicate the particular device can be set as associated with the particular task (e.g., before the next listening cycle takes place). In the future, the task can be recognized, and controlling which device performs the task can choose the particular device for the particular task based on the user preference.

Another machine learning feature can be implemented based on device correction. For example, if a task begins on a particular device, the user can say, "No, not on device X, but device Y." The system can record such corrections and treat them similar to the explicit specification of a device as above. So, responsive to receiving a device correction command, the system can store a device preference for a task.

Machine learning can take task domains into account (e.g., repeatedly consistently specifying a particular device for tasks in a domain can result in the device being set as the preferred device for the task domain).

Example 24—Example Device Capabilities

In any of the examples herein, a device can store an association of capabilities with preferred devices. Thus, a device is associated with one or more capabilities. In practice, such capabilities can be tasks, subtasks, scenarios, or the like. For example, an association between a play game task and a game console indicates that the game console is a device that can play games (or a particular game).

When a task is recognized, it can then be performed at a device that has the capability of performing the task as described herein. For example, a primary device that performs voice recognition of the command phase that does not have the capability to perform the task can hand the task off to a device that does.

Thus, it can be determined that a recognized task is not performable at an electronic device via the stored capabilities of the devices. Responsive to such a determination, another electronic device can be selected to perform the recognized task.

The task can then be handed off as described herein. A wake command can be sent beforehand to wake the device receiving the handoff. As described herein, the receiving device need not necessarily hear the voice command.

Example 25—Example Decision Criteria and Arbitration Rules

In any of the examples herein, a wide variety of decision criteria and arbitration rules can be supported. Criteria can include user choices and preferences. Rules can include user-defined rules.

For example, response arbitration rules can be applied by an arbiter during initial listening to determine which device should initially respond and recognize a command phrase. Such rules can take into account user preferences (e.g., indicating a primary device), recorded activity detected by one or more hardware sensors of a device, or both.

As described herein, a variety of criteria can be maintained. For example, recorded activity can be stored as described herein to determine the most recently used device, most frequently used device, or the like. Depending on the activity, a device can be denoted as the device that a user is using (e.g., currently using). Hardware sensors can assist in such a determination (e.g., the user is proximate to a game console as determined by a camera, the user is holding their phone, or the like).

A supported approach to controlling which device responds is to choose the device that has been designated as the primary device for the interconnected devices (e.g., according to a user preference). Responsive to determining that such a device is not available (e.g., it does not respond to polling as described herein), a fall back list of devices can be used to determine which device is acting primary. The fall back list can be list of devices, list of device types, or list of device designations. If a device designation of most recently used is in the fallback list, the device with the most recent activity can be chosen. For example, if the recorded activity indicates physical activity near or at the electronic device, the controlling can choose an electronic device having most recent physical activity. Such activity can be further tagged to associate it with a particular user (e.g., based on voice recognition, face recognition, skeletal recognition, sign in name, or the like).

An example fallback list is as follows: preferred device; the device that is currently active; the device that was most recently used; service provide default device. The list can further continue with wearable device; phone; tablet; laptop; game console; and desktop.

If there is a tie between devices, the system can choose the most recently used or most frequently device.

Other arbitration techniques can be applied. For example, a statistical approach can decide which device responds based on which one the majority of users choose (e.g., choices can be logged anonymously and pooled to crowd-source the machine learning). As described herein, if a device is explicitly uttered, the indicated device can be selected. If a user was engaged in a multi-turn dialog via a certain device, the likelihood of the certain device can be increased (or it can simply be selected).

Task arbitration rules can be used by an arbiter after recognition of a command phrase to control which device performs the recognized task. Such rules can take into account a user device preference (e.g., for a particular task) or capabilities of the interconnected electronic devices. When a preferred device is not available, rules of succession for devices (e.g., a fallback list of devices) can be used to determine which device will perform the task. The fallback list can be similar to that as for responding, except that the device capabilities can be used to filter out devices that cannot perform the task.

Hardware of the device can be used to influence the decision (e.g., when playing music, the device with the best quality speakers can be selected).

Additional criteria can be supported, such as speaker mood, how many people are in the room, how many devices of other users are in the room, time of day, activity detection (e.g., holiday, vacation, day off, driving, walking, etc.), work/home status, demographics, personal features, data availability, or the like.

The mechanism by which rules are implemented can vary. For example, a decision tree, neural network, or the like can be used.

Machine learning can be implemented to allow the rules to evolve based on learned user behavior or preferences as described herein.

Example 26—Example Handoff

The handoff experience can be made smooth and fast to the user. For example, the first device can acknowledge (e.g., with text, sound, or the like) that the wake phrase has been recognized. The second device can wake up with a simple audio prompt, silently accept the command and respond as if the user had already spoken to it. The user need not repeat themselves.

The command phrase that the user uttered can be saved. The other device can be activated (e.g., a signal to wake up the receiving device can be sent before the handoff), and the saved command can be passed to the other device. The user can be informed of the handoff to avoid surprising the user and give the user the opportunity to redirect.

Although the device to which the handoff is made can be listening, it need not be listening or even capable of voice recognition. It need only be capable of receiving a handoff message and performing the requested task.

Example 27—Example Delayed Handoff

In any of the examples herein, a handoff can take a delayed form. For example, if it is determined that a particular device is currently unavailable but is reliably available in the future (e.g., the user turns on their laptop every morning), the handoff can be delayed until the unavailable device is available. Such a scenario can be used for a task that does not expire before the device becomes available (e.g., "Remind me to call X over lunch.").

Example 28—Example Topology Formation and Evolution

In any of the examples herein, a topology can form and evolve in a variety of ways. For example, devices of other users can be excluded using authentication technology such as speaker identification or verification. Further details can be implemented as described herein.

The topology can start with those devices that are near each other. "Near" can be implemented as on the same network, in the same building, within a threshold physical proximity, within wireless range (e.g., Wi-Fi, Bluetooth, or the like), or the like.

When a user utters the wake phrase, the topology can reduce to those devices that have wake-up/voice detection capability because such devices are the ones listening for the wake phrase.

The topology can then further reduce to the set of devices for which the uttering user is authorized. The following can be included: Personal devices with speaker identification that the user is already registered on (and therefore recognize the user's voice); shared devices (e.g., devices that would respond anyway and do not check speaker identification); personal or shared devices in guestmode or without speaker identification (e.g., may ask for password and/or PINs then, later on, or not). Such devices can be implemented as other personal devices that do not have speaker identification enabled.

The remaining set is the set from which arbitration determines which device to respond. Using the techniques described herein, a single device can be chosen, so the topology can be considered as reduced to one.

However, it is an option that the responding device (e.g., whether selected automatically or explicitly) can be a different device (e.g., a handoff scenario). In such a case, the topology broadens to those devices that support being handed off to. This is not necessarily the same set that supports wake-up/voice detection capability because it is possible to handoff to a device that does not listen (e.g., has no microphone).

Example 29—Example State Machine

Figure 5:
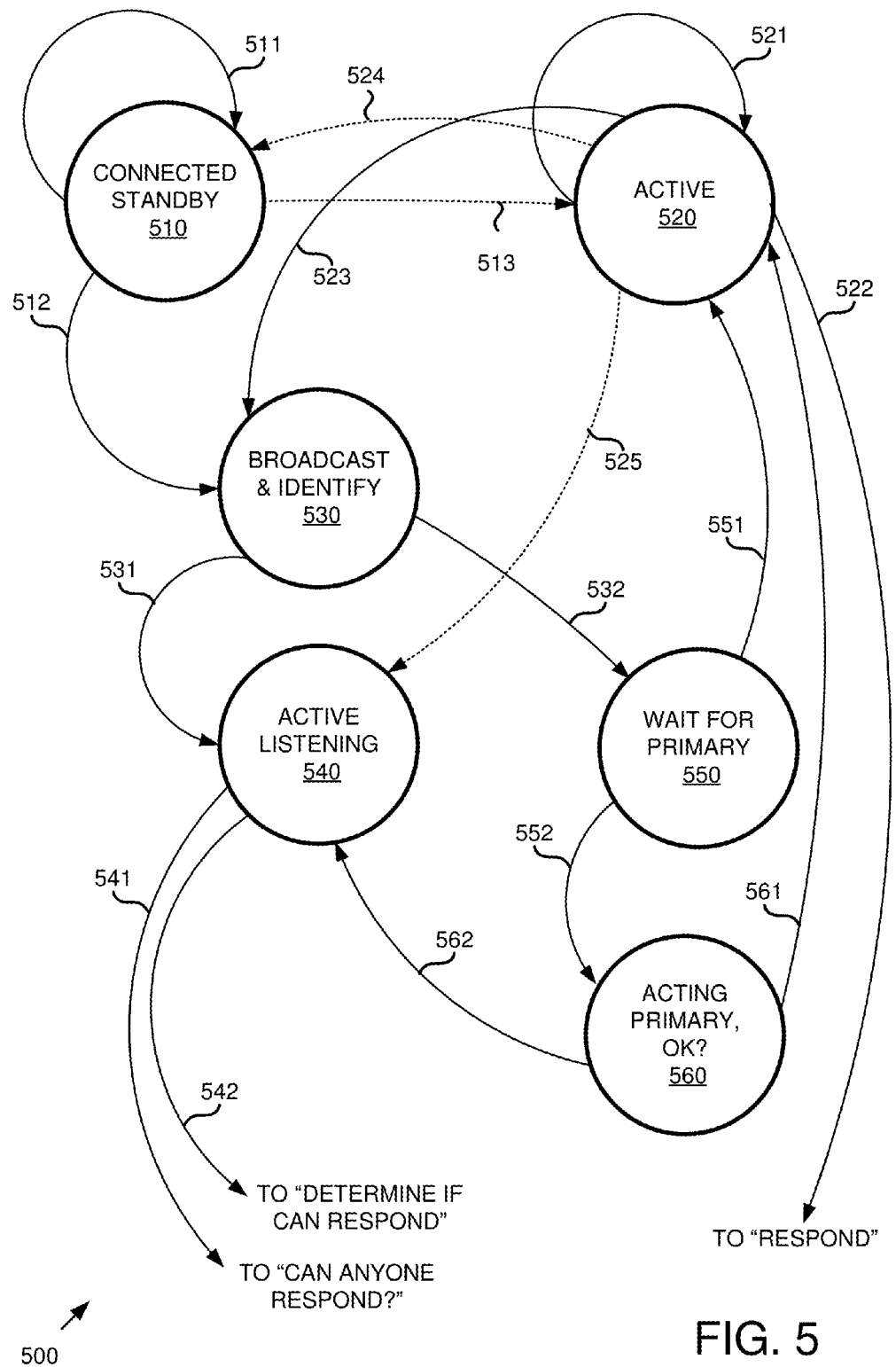
FIGS. 5 and 6 are a diagram of an example state machine for controlling which electronic device responds to a wake phrase and controlling which electronic device performs a recognized task.
Figure 6:
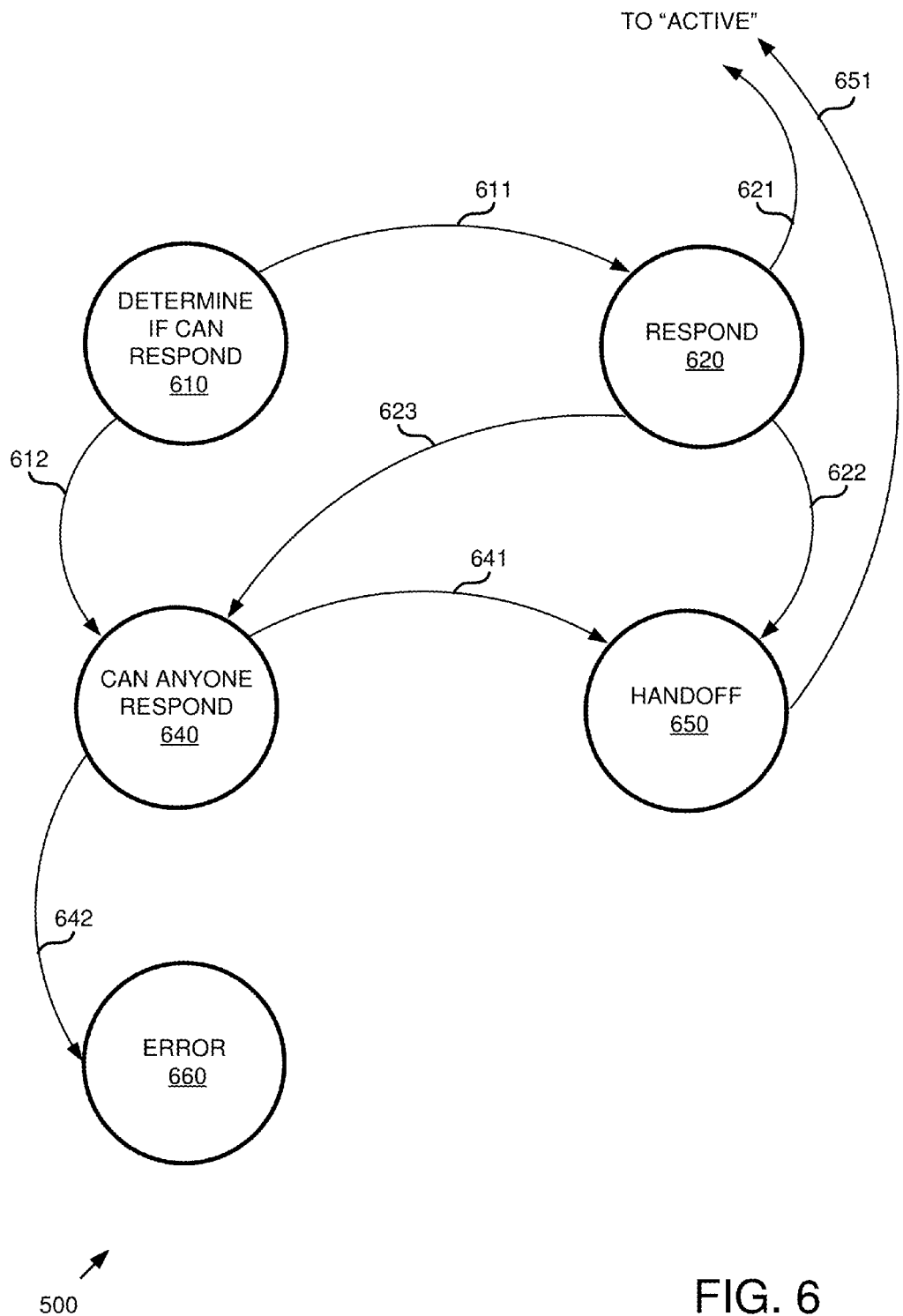

FIGS. 5 and 6 are a diagram of an example state machine 500 for controlling which electronic device responds to a wake phrase and controlling which electronic device performs a recognized task. The state machine 500 can be used to implement the technologies described herein. In this way, arbitration can be accomplished to implement a positive experience when there are multiple endpoints to a virtual persona that can respond. The right endpoint (e.g., based on perceived user intent) can be chosen to respond. The process can begin when the user starts a voice interaction out loud, such as a wake phrase, command phrase, or combinations thereof.

In practice, the state machine 500 can be modified without departing from the inventive concepts described herein. For example, states can be combined, split, omitted, and new states can be added while still implementing appropriate functionality.

At connected standby state 510, the device is listening. A device in such a state can be in a low-power consumption mode that listens for a wake phrase as described herein.

If the device recognizes the wake phrase or the wake phrase in conjunction with a command, it transitions 512 to the broadcast and identify state 530.

If the device wakes (e.g., for any reason), it can transition 513 to an active state 520. If it goes to sleep, it can then transition 524 back to connected standby 510. When active, if the device does not recognize the wake phrase or if an unauthorized user said it, the state loops 521 to itself. Or, if the device recognizes the wake phrase, the wake phrase and a task, or the wake phrase and a task and a device, it can transition 523 to broadcast and identify 530. If it receives a device handoff without a task, it can transition 525 to active listening 540. If a handoff is received, the device can transition to the respond state of FIG. 6 and respond immediately.

From the broadcast and identify state 530, the device can let other nearby devices know that it heard the wake phrase. The device can identify whether it knows it is a primary device and polls for other devices. This work can be accomplished within a latency target (e.g., 200 milliseconds or the like). A second poll (e.g., recheck) can be done in another latency target (e.g., 100 milliseconds or the like) in the case of latency overrun.

When in the broadcast and identify state 530, if a determination is made that the device is the primary device (e.g., as indicated by the primary device designation), it can transition 531 to the active listening state 540. If it is not the primary device, or if it is unknown whether it is the primary device, the state can transition 532 to wait-for-primary 550.

From the active listening state 540, an audio prompt can be sounded through a speaker to acknowledge the wake phrase and await a command if no redirect in the voice command is pending. The state remains in active listening 540 only if a voice command has not yet been recognized.

If a voice command and device have already been specified, and the device is not the current device (e.g., the device processing the command), the state can skip active listening and attempt to redirect.

If an intended device is voice recognized and it is not this device, but no task has been specified, the device can first handoff and then go to active listening 540.

When in the active listening state 540, if a voice command is recognized, the state can transition 542 to the determine-if-can-respond state in FIG. 6. If a voice command directs to another device (e.g., the responding device was not the one the user intended, and the user explicitly redirects to another device), the state can transition 541 to the can-anyone-respond state in FIG. 6.

If a device hears no primary device, it can broadcast out that it is going to respond as a primary device based on rules of succession (e.g., fallback as described herein). When in the wait-for-primary state 550, the device can wait for a known primary to broadcast. If a primary device broadcasts or another device becomes primary first, the state can transition 551 to Active 520. If the wait times out, the state can transition 552 to acting primary, OK? 560, where the device attempts to assert itself as the acting primary device.

When in the acting primary, OK? state 560, if the devices acknowledge the new primary or there is no response, the state can transition 562 to the active listening state 540. However, if another device challenges successfully and becomes primary, the state can transition 561 to Active 520.

If the command phrase includes the intended device, but it is not the current device, but a task is not yet recognized, the device can handoff and then go to active listening. When in the determine-if-can-respond state 610, if the device can respond, the state transitions 611 to a respond state 620. It can then carry out the task and return 621 to the active state in FIG. 5. If the device cannot respond, it can transition 612 to a can-anyone-respond state 640. A determination of whether the device can respond can be based on the nature of the recognized command (e.g., the task), determined intent, and other signals, explicitly, implicitly, or learned, and device capabilities, data availability, or the like as described herein.

In the respond state 620, responses in some scenarios may involve further handoffs. If so, the state transitions 622 to the handoff state 650. Also, a user can interrupt and redirect, causing a transition 623 to the can-anyone-respond state 640.

In the can-anyone-respond state 640, the device is unable to meet the user's intent or the user has voiced a desire to redirect. So, the device polls for any nearby device that can meet the determined needs. It can then chose the right device based on implicit or learned signals, or lets the user redirect via voice command.

If no device meeting the criteria is available 642, it can try again, attempt to recover, or play an apology for the user in an error state 660. It can then return to active state in FIG. 5.

However, if a device is available that meets the criteria, the device can inform the user appropriately (e.g., via voice) and send a handoff signal to the next device to respond immediately. Thus, the state can transition 641 to a handoff state 650. The handoff coded signal can be sent to a standby or active device to get the receiving device to respond immediately to the user (e.g., the receiving device goes into a respond state 620). The receiving device can be awoken first if in a standby state. A transition 651 to active state can then take place. In some cases, a handoff can be sent without a command because the command phrase specified the device but not the command. The receiving device of the handoff can go into active listening instead of respond state.

When user choices are detected (e.g., the user makes a choice and says a command phrase or responds to questions), when a device responds, or when a device is handed off to, the system can learn the user's preferences and patterns. This then enables auto-redirection inferred by the user's behavior.

Various scenarios can be supported. For example, a lock screen can be abstracted into an authorized user. Or, any user is authorized for a shared non-secure device.

For example, in practice, a "lock screen" state can be supported where the device is on (not standby) but not fully active (e.g., it is locked). How it becomes unlocked can vary depending on the scenario. For example, some tasks can be performed above the lock (e.g., without unlocking the device). Other tasks may require unlocking. If the user is authorized, the lock screen state is not of concern. Therefore, the lock screen state can be abstracted away and represented as an authorized user for purposes of illustration.

A device in connected standby can become active through other means not shown (e.g., wake-on-LAN, receiving handoff command from another device, etc.).

A wake phrase may not be necessary in some active cases. A user may use other means of invocation not limited to voice.

In the can-anyone-respond case, users can also explicitly redirect. But, this is abstracted into "a device with that criteria (e.g., including user-defined criteria) is present and can respond."

User overrides can be supported. A user may choose to make more than one device a primary, in which case several devices will reply in unison or nearly in unison, resulting in an omnipresent effect, or a user may choose to disable voice commands for any or all devices. The described states can respect such user choices.

Different arbitration logic and rules can be used in the system and based on implementation, so they are not explicitly defined below.

Additional transitions to and from the error and learn states can be implied and are not explicitly shown.

Example 30—Example Message Content

In any of the examples herein, a variety of information can be passed between the devices as part of the arbitration process. For example, messages can be used to communicate a device type, continually track nearby devices, continually communicate device state between devices, synchronize time between devices, or the like.

Messages can include a device type and core device capabilities (e.g., has screen, can play audio, is connected to Internet, or the like). The current device state as described herein can also be communicated. Current task device capabilities can also be included (e.g., whether the device can complete the current task, at what quality level, or the like). Current device time can also be provided (e.g., for synchronization).

Example 31—Example Multiple Device Scenarios

Problems with multiple device scenarios include: Determining which device should respond to a user's commands when multiple nearby devices are listening for voice commands and representing the user's expectation of a response from a specific device. The described technologies can provide rule-based and machine-learning-based approaches to solve such problems.

Devices that have wake-on-voice capability can contact an arbitration service when they hear a wake phrase, whether they are already awake or not.

As a virtual persona gains always-listening activation capability across an increasing number of devices, users will encounter situations when multiple devices supporting the virtual persona are in proximity to a wake phrase. Without a way to arbitrate between these devices, uttering the wake phrase will result in several devices—even shared ones or ones not belonging to the user—responding with the audio prompt echoing throughout the room. There is then uncertainty when the user gives a command. For example, it is unknown if all devices respond; whether they take the same action, conflicting with each other; or what happens if a device cannot respond to the command. Getting it wrong results in a bad user experience, and reflects poorly on the service provider.

A target user experience can be defined and designed for voice wake-up activation in a complex world of ever more devices, capabilities, and user expectations. Implementations can use a model that is simple for the user to understand and expect. From the devices that heard the wake phrase, the user's preferred device is typically the only one that will respond. However, if the preferred device is not available, then the system can follow a simple fallback scheme until it arrives at a device that can respond.

The model can be extended and smart features added to meet a variety of cases and conveniences for the user.

Aspects can include the following:
Ability to arbitrate and be deterministic on the appropriate device to wake-up on command.
Use of hardware sensors to best determine what device is active (accelerometer, front-facing camera, etc.).
Elaborate machine-learning models that allow the system to learn and automatically determine the preferred device that the user intended to interact with for the situation.
Elaborate models that take into account the scenario, available devices, capabilities, and dynamically select the best one for the situation.

In a room that has multiple listening devices (e.g., television, tablet, laptop computer, phone, consumer electronic device) and multiple users, the right (e.g., expected) device responds to the right (e.g., expected) user at the right time.

Example 32—Example Description

The following describes various additional embodiments. Although an example of a digital personal assistant system named "Cortana" is used, the technologies can be applied to any of a variety of digital assistant systems, and the digital assistant can have any of a variety of names.

Similarly, although the example wake phrase "Hey Cortana" is used, any number of other wake phrases can be used instead while still benefiting from the described technologies. Such phrases can be called "keyword phrases," "trigger phrases," or the like.

Although some examples use Microsoft technologies, other technologies can be substituted in place thereof.

Example 33—Example Features

In any of the examples herein, the technologies can provide device arbitration for devices (e.g., with always-listening and wake-on-voice capabilities).

The devices can be inter-connected via the technologies described herein, which can arbitrate which device responds to the wake phrase.

A device can be woken up via chaining of which device to wake up. For example, "Hey Cortana, do XYZ on ABC device," can result in waking device ABC, even though a different device initially responds and/or processes the command.

The technologies can control which device responds based on the capabilities of the device. For example, "Hey Cortana, send an email to X" can result in non-response from the device(s) that do not have an email client to compose and send an email.

Example 34—Example Features

The technologies can define "the right experience" for when multiple devices hear a wake-up voice command, noting considerations such as impact of mode or special-cases that require differing experiences.

Wake-up scenarios and requirements from devices using a virtual persona can be represented.

An arbitration service can be designed.

Wake-on-voice and Speaker Recognition technology can satisfy security concerns. The system can be configured so that a user can only wake up devices the user is authorized to, whether on a personal or shared device, or even devices without the same service provider account. If it's the same voice, the system can look at the devices that wake up. If a device has wake-on-voice without speaker recognition, the device can still wake up and participate in arbitration.

The model can be further developed so that devices without such systems can be included in the arbitration model.

After a device wakes up, it is up to the device to enforce whether a user is allowed to access subsequent information.

Devices can be categorized into logical devices. For example, starting with all devices, those devices that have wake-up (e.g., wake on voice) capability can be categorized as "Devices that heard the user." Within those devices, the devices that the user is authorized or enrolled on can be determined via speaker recognition, guestmode, or the like. Those devices can awake (e.g., go into full listening mode).

Of the devices that awoke, the arbiter service chooses one device to respond. The chosen device then attempts to handle the scenario (e.g., dictated by a command phrase) in light of security and other limitations. If it is not possible, a different device can be chosen (e.g., via a handoff).

The technologies are not limited to those devices described above. For example, the technologies can handoff to or activate devices that did not hear the user.

Example 35—Example Further Features

Devices that have wake-on-voice capability can contact an arbitration service when they hear a wake phrase, whether they are already awake or not.

Only one device actually responds to the user. (An arbitration service can measure this by comparing the # of devices that heard a command and went to the service, with the number that responded.)

A user can set a "preferred device" for wake-on-voice. For example, a preferred device designation can be received and stored in the device. By default, this device can be the phone.

If the preferred device is not available, the service can pick a fallback device based on the schemes described herein.

Example 36—Example Problems

As the number of devices users typically have increases, users are likely to encounter situations in which multiple devices could respond when they say a wake phrase.

A user can be given the impression that the user is talking directly to a virtual persona and getting the data and tasks desired. The technology in the middle can be made transparent, even if multiple devices wake up.

Without arbitration, however, various problems can arise:
Echo problem. With current processors, wireless capabilities and speakers, the response is typically not in sync, and does not sound like a single, pleasant, omni-directional sound. So instead of a unified response, a disconcerted cacophony of devices jockey to answer. Out-of-sync earcons is an unpleasant experience.

Confusion and worry. Furthermore, because the user perceives the response as several independent devices, the user is apt to be confused & disoriented (e.g., does not know which one is being talked to, does not know where to look, etc.) or worried (e.g., if the user gives a command to buy something, will they buy it twice?).

Feature attach: If the user has to disable a device's wake-on-voice so that it stops conflicting, the user may not turn it back on again and so stops using the feature and loses its benefits.

Perception of Service Provider. If multiple devices respond in an uncoordinated manner, it reflects poorly on a unified, works-well-together strategy.

Therefore in some implementations, only one device should respond.

Implementing a single responding device presents some problems too:

Matching expectations—the task the user had in mind was for a specific device. Why did some other device respond? And if the device that responded was out of the way, it causes confusion and disorientation for the user because now the user has to find and face this other device. The user could also insist it redirect to the device the user intended.

Managing expectations—There are many things that a user can ask the virtual persona. Which device should the user look to, to do what?

Handling capabilities—For the system, not every device might be able to play a movie or have the user's data immediately handy. If the current device can't or won't take care of the requested action, a fallback and error handling experience can be provided. The pool of devices can be determined.

The proximity problem—which devices are near the user? The user typically does not desire to have far away devices unlock, since someone else might be able to access them before the user can. There can be audio solutions to detecting proximity. However, an implementation can simply pick from the devices that heard the user.

There are also some general problems:
Multiple accounts for same user: what if the user is using a different service provider account on one device versus another?

Shadow users: some shared devices may have multiple real-life individuals using the same shared virtual persona accessing account.

Security: Is the user's data safe and secure from other people's voices? The user typically does not desire someone else to be able to use the user's device just by their voice.

Embodiments can use speaker recognition technology. There is a step the user can take to setup their voice for speaker recognition, so if the user has done that step, that device can be modeled as being accessible to the user. This can handle the detail entailed by accounts, guestmode, and device permissions.

Example 37—Example Features

"Activation" can describe when a device receives a user signal to come out of standby and be ready for use. Generally, voice activation ("using your voice to wake-up a device") can be used, but other natural-user-interface-based activation can be used.

"Wake up" can describe when an always-listening device goes from a low-power "only listening for specific wake up word" mode to full-listening mode.

"Nearby" can describe a device that is physically close to the user. For activation scenarios, devices that were near enough to hear a user's command can be considered as nearby.

A device type can be personal or shared as described herein.

"Right device" can mean the specific device that the user intended to use as evidenced by criteria collected by the devices. In most situations, there is a specific device the user intended to use. For activation this may hold true. For proactive audio, there may be no one "right" device.

A preferred device can be the one the user elects to have respond to the user's voice commands.

A default device can be a service provider's suggested preferred device, until the user changes it otherwise.

An active device can be the one that the user is currently using. An unlocked status pre-requisite can be imposed.

Users of a device can be categorized as described herein.

A situation can include a meta-scenario that users can encounter when activating devices.

Proactive audio can include a situation when the device activates without a user request, such as for incoming calls or alerts.

Passive listening can be when a device is just listening for the wake phrase to wake up.

Active listening can be when a device is listening to the user's whole utterance and command (e.g., a command phrase).

Turn-by-turn can be used when referring to navigating a dialog (e.g., not roads). Such a technique can be used when the system tells the user information or asks a question and then automatically listens for a user response to help disambiguate or prompt further commands. For example, a virtual persona may say "did you mean weather for Redmond?" then automatically starts listening as it's the user's turn to provide information "yes, please."

"Passive listening" and "active listening"—passive is when the device is listening for the wake phrase, active listening takes place after that (e.g., when the device is awoken).

Example 38—Example Ways Users Start a Voice Wake Up

For example, users may say:
1. Wake phrase (e.g., "Hey Cortana");
2. Wake phrase plus a command phrase with a task (e.g., "Hey Cortana" "do XYZ");
3. Wake phrase plus a command phrase with task and device (e.g., "Hey Cortana" "do XYZ" "on ABC device");
4. Wake phrase plus a command phrase with a device (e.g., "Hey Cortana" "on ABC device");
5. Or the like.

The wake phrase typically characterizes a wake-up command. The task and the designated device can come in any order.

Example 39—Example Types of Devices

For arbitration purposes, two types of devices can be defined: a device that is "personal" to and largely used just by a particular user, and a "shared" device that has other primary users too.

A personal device typically has a primary associated account. The device generally presumes it's their own user. Such devices can include wearable devices, phones, tablets, and some laptops/desktop computers (e.g., depending on configuration). In the user's mind, a personal device responds only to the user. So, such expectations can be implemented by the technologies.

A shared device typically has multiple associated accounts. The device expects multiple users, and possibly guests. Such devices can include game consoles (e.g., Xbox or the like), wall-mounted touchscreen devices (e.g., Surface Hub), some desktop/laptop computers. In the user's mind, the machine is a generic machine, and it is expected that the machine load the user's account (e.g., from a list of possible accounts).

A device can need arbitration only if it was near enough to get the command in the first place. Where speaker recognition is assumed, the two device types can be treated the same.

Example 40—Example Representation of the Default and Preferred Device

An implementation can have a default device that responds based on a combination of the user's scenario (one of N virtual persona domains) and device capability to respond to one of those domains. That way, the best/right device for the situation responds. However, it is a hard scientific problem to guarantee the best device, and based on usability studies, users do not like unexpectedness and unpredictability in which device responds. It is hard for them to keep track of an N×N matrix of devices. And, getting the device wrong is a bad user experience.

In the interest of simplicity and being consistent with expectations, two designations can be used:

Preferred device: The user declares which device would be expected to be the one that responds to their voice activation. The specified device can respond, even if the user is actively on another device.

Default device: by default, this is set to the user's phone. The user can then change the default if they want to.

More elaborate defaults and preferences can be added. For example, there can be a preferred communication device, preferred entertainment device, or the like. Machine learning of the user's behavior can be used to infer the preferred device.

Example 41—Example Situations Categories the User Could Encounter

Broadly, arbitration "situations" that a user could encounter can be categorized as follows:
1. Activating personal devices
2. Activating shared devices
3. Proactive audio Some observations on the situations are described below, to inform the scenarios and detailed design of the arbitration rules.

Example 42—Example Situation: Activating Personal Devices

When activating personal devices, situations can arise. For example, if there are two speakers, speakers other than the user can be prevented from using the user's phone. In some cases, a user can delegate use to others (e.g., family members such as children).

In cases where there are multiple users and multiple devices, the system can be configured so that only the user's device responds to the user. Gatherings, public places (e.g., bus) or the like can present such situations.

In cases where there is one user and multiple personal devices, a decision can be made as to which device responds. For static cases, a device can be chosen for tasks such as playing music, turning on a light, or the like. A device can be chosen to update or synchronize information. Syncing state across the devices can be accomplished (e.g., so that if device B is playing music, device A is prevented from also playing music).

For dynamic cases, a user can start with one device and then finish on another. The mix of nearby devices can change. If one device cannot respond but another can, a handoff can be done.

A mode of interaction (e.g., touch) can cause a device to take precedence (e.g., because the user is actively using it as indicated by the touch). In some cases, two devices can be used simultaneously.

A decision can be made quickly by limiting the pool of devices to those that were close enough to the user to hear the wake up command.

Example 43—Example Situation: Activating Shared Devices

In a shared devices situation, there can be one device with multiple users. The right user can be matched to the right data (e.g., the user's calendar). How the device recognized the user in the first place can be determined. A kids/guestmode can be supported so that others can watch television, play games, check weather, or turn on the lights without having access to the user's data.

A retail experience can be supported so that trial users can try out the virtual persona to entice them to buy.

When there are multiple devices and multiple users, in a home situation, the right user can be matched to the right data, and the right device can respond.

In a retail situation, all devices responding to a wake phrase can be prevented.

When there are mixed personal and shared devices (e.g., user has wearable device, phone, and shared device present), the situation can be modeled as several devices belonging to the user.

Example 44—Example Situation: Proactive Audio

In a proactive audio situation, a decision can be made regarding which device (e.g., personal or shared) alerts the user. For example, dismissing reminders, sounding an alarm clock, or the like can be supported. A decision can be made as to whether the alert should come on more than one device (e.g., all devices) or just one.

In a mixed personal and shared devices environment, dismissing reminders can be supported. However, personal reminders can be prevented from coming up on shared devices. But, if other users have permissions to see the reminder, it can be provided to such other users.

Example 45—Example User Types (Device's Point of View)

For purposes of illustration, one can consider five levels of user permissions on a device:
1. Primary: Primary owner and user of a device
2. Shared/secondary/limited: Shared/secondary/limited user of a device that is known in advance
3. Guest: an unknown user that still can use some of the device's capabilities
4. Unauthorized: Unauthorized a user not authorized to use this device
5. Unknown: Unknown a user not known to the system The above is not a comprehensive list of roles/rights (e.g., IT administrator can be added), but is helpful for purposes of illustrating arbitration.

Example 46—Example Design and Interaction Principles

If the user started a voice interaction on one device, the system can be configured to finish the voice interaction on the same device, unless there is a very strong reason to change. The actual action can make use of other modalities, such as a supplemental screen that shows a menu of options to the user.

Generally, if the user has an audio wearable enabled, that wearable can be configured to be the default or preferred device (again, unless there is a strong reason to change).

Example 47—Example Support Scenarios

When a user uses the wake phrase, the expected device can respond. User B mainly associates his tablet as the device he typically uses for the virtual persona. So, when he says the wake phrase, he expects his tablet to wake up, not his desktop, because his tablet is his preferred device.

This keeps the user's expectations simple. The user knows that no matter his task, if he only says the wake phrase, his tablet will wake up. If he wanted a different device to turn on, he'd say so (e.g., <wake phrase> play a movie on my <device>).

But, when his tablet is not nearby, or is off, he desires some easy logic to what happens next. For example, the device he is using responds as described herein. Or, the device he most recently used responds. And, if none of those are available, then expectations are not clear. So any device can respond.

The system can allow a user to designate the user's preferred device. For example, user A buys a brand new device (e.g., any arbitrary device that supports the virtual persona). As the arbitrary device is set up, she enrolls her voice so that she can use voice-activated features. During the enrollment process, the device asks her if she wants to make it her preferred device. She may decline, assuming that she will use another device (e.g., phone) most often.

However, after a few weeks pass, she tells the virtual persona to make the arbitrary device her preferred voice wakeup device, which is then implemented.

There are various entry points for such a scenario. It can be presented as an option during speaker identification enrollment. This is where the user discovers the preferred device option. An option can be provided in a control panel or device settings (e.g., adjacent to speaker identification settings). And, a virtual persona voice command for settings can be used (e.g., "Hey X, make this device my preferred wakeup device). In response, the system can change the preferred device across the collection of the user's devices.

The system can allow a user to redirect (e.g., by voice) if the wrong (e.g., unexpected) device responded. User C said the wake phrase, and an unexpected device responded when she really wanted her laptop to respond. So she says " . . . on my laptop," which signals the system to transfer over to the laptop.

Later, user C realizes that she can also just include the device explicitly (e.g., "Hey Cortana, play a song on my laptop") to skip a step if she believes the wrong device will respond. Ultimately, she can update her preferred device as described herein to avoid having to repeatedly explicitly indicate it.

The system can allow a user to activate a device that did not hear the user, through a device that did hear the user. User H is standing near the kitchen of his living-kitchen area. His phone is near him. He wants to play a game on his game console, which is on the other side of a large room. He can speak the wake phrase, and the phone responds with an earcon (e.g., the game console is out of range). He can then say "Play <game name> on my <game console>." The game console activates, even though it did not hear him the first time. The range of the virtual persona can thus be extended.

If the device is out of range, unlocking it may enable unauthorized access to bystanders. So, the scenario can be enabled only if the user explicitly calls out the device to redirect. Such a scenario can also be used in situations where a device cannot complete the task and hands off to a device that can.

Example 48—Example Further Scenarios

For users and speaker recognition, a variety of scenarios are possible.

A device can be configured to respond only to its associated user. Whether at home, at work, or outside, and regardless of the presence of others, the device can respond only if device's user says the wake phrase. When someone else says the wake phrase, the device can omit responding. For shared devices, it can recognize or at least answer. Speaker recognition technology can be used to accomplish such a result.

However, some guests can be permitted to use a user's device on occasion. For example, if a child wants to use child-directed functionality on a machine, or if a guest wants to turn on the lights in the house, the virtual persona can answer them. However, personal information can still be protected. The fact that a guest voice wakes up a device can be used as an arbitration criterion.

A shared device can be shared to a limited degree. Others can have limited access (e.g., not be able to impersonate the user of the device). So, the device can respond without granting full access to all functionality.

In a retail environment, a guest mode can be used for devices to allow a potential buyer to speak the wake phrase and not have all devices respond.

General commands can omit a device, and arbitration can select an appropriate device. For example, "<wake phrase> play some music" can result in any device that can respond to play the music.

If a user intends a particular device, the system can determine the device and have it respond. A preferred device can set user expectations on which device should respond. A user can also redirect through an error experience if the wrong device responds. Walking toward a device can be interpreted as being the expected device.

Touching a device can make it the device that responds. For example, unlocking a device by entering a password/PIN on a keyboard, touchscreen, or the like can indicate that the user expects that the touched device is now the device that will respond. However, in some cases, a different device may respond.

If a user was recently using a device or is near it, it can be the one that is expected to respond. If a user was just using a tablet and then another question comes up, the user can say the wake phrase, and the tablet responds.

However, if a device that is determined to be the expected device cannot perform the desired task of a command phrase, a different device can respond. The expected device can perform a handoff and play an indication that the handoff is taking place (e.g., "OK. I will show you the pictures on your PC"). Certain functionality can simply be unavailable, resulting in an error condition. For example, if a driving condition is detected, a request to look at pictures can be denied, even if technically possible.

If the user is wearing a device, it can be the one that responds. It can be set as the preferred device.

It is possible to start a task on one device and finish it on another device. For example, a command to an audio-only device can respond with "OK" but then visual options can be shown on a nearby screen. The audio-only device can direct the user to walk over to the nearby screen.

There are a number of scenarios about getting proactive audio, such as alerts.

Personal alerts can be limited to be voiced only to the associated user, where the user is. For example, a reminder about a surprise birthday party can be limited to coming only to the device next to the user.

Big alerts or public phone calls can go anywhere. For example, a weather alert can be spoken and/or shown on any of the devices. Incoming phone calls can also ring multiple devices. Audio synchronization between the devices can be used.

When a user dismisses an alert or reminder at one device, it can be avoided to show it again on another device.

Example 49—Example Features—Arbitration Service

Any electronic device that implements a virtual persona can use the technology. The entire system need not negatively impact the experience of users who have only one virtual persona device. Arbitration can assume always on, wake phrase, and speaker identification capability.

High performance can be offered so that devices respond fast. Arbitration can happen quickly Wi-Fi or other technology can be used.

Notifications and proactive audio can be supported.

The system can support a preferred device by category, default device by scenario category, and machine learning of user preference.

Arbitration can work even when some devices are associated with different service provider accounts. Arbitration can work even when one or more devices are not Internet connected.

Even if multiple devices wake up, a single chosen one can be the only one apparently responding to the user. Other devices can remain silent and return to a standby state after the user command is issued.

Example 50—Example Features—Preferred Device

A user can set a preferred device for voice wakeup response. The preferred device settings can be part of speaker recognition enrollment. They can be placed in a speaker recognition setup. Preferred device settings can be invoked via a virtual persona voice command. The default device for voice wakeup can be the phone, followed by others. If more than one preferred device is associated with a user, the system can prompt the user (e.g., to choose a single device).

Example 51—Example Features—Fallback Capability

A fallback capability can be implemented in case there is not exactly one preferred device in range of the spoken wake phrase (e.g., the preferred device is off, not in range, or the like). The system can infer which device is currently being used by the user. For example, a notion of which device was the most recently used by the user with the recognized voice can be maintained.

Example 52—Example Features—Handoff and Error Capability

Devices can be named, and matched to a device specified in a command phrase (e.g., "on ABC device"). A user can specify a device during the second "turn" after wakeup. The first device that wakes up can wake up a second, user-specified device that was not already awoken by the user's voice.

The first device can pass to a second device the already-received user command so that the user does not have to repeat it.

A device can be configured to listen for and accept handoff commands (e.g., from other devices over a network, wireless or otherwise). If a device cannot handoff, it can undergo an error process (e.g., and inform the user). Similarly, if a device cannot complete the commanded task, it can undergo an error process. If a device cannot complete the task, but another device that woke up can, the device can hand off the task to the capable device.

Example 53—Example User Interface Storyboard

The model can be kept simple from the user's point of view. When a user speaks the wake phrase, just one device responds within a reasonable amount of time (e.g., 0.2 seconds). The device that is chosen to respond is typically the user's preferred device. If not exactly one preferred device is available, a fallback device can be chosen.

The user can then say their command (e.g., "do XYZ"), a device (e.g., "on ABC"), or both (e.g., "do XYZ on ABC").

If it is a command meant for the processing device, the device attempts to carry out the command. If the device cannot, it can handoff to a device that can or tell the user "Sorry, I cannot do that."

If it is a command for another device, the processing device can attempt to wake up the other device and pass the user's command on to the other device. The other device can respond with an audio prompt, wake up, receive the pre-sent command, and then follow the above actions. If the other device is not available, an audio indication can be provided on one of the devices.

Error handling can be incorporated by saying "on ABC" device to redirect. Some implementations may not support chaining the wake phrase with the command phrase but can still implement the technologies described herein.

Example 54—Example Other Implementation

Figure 7:
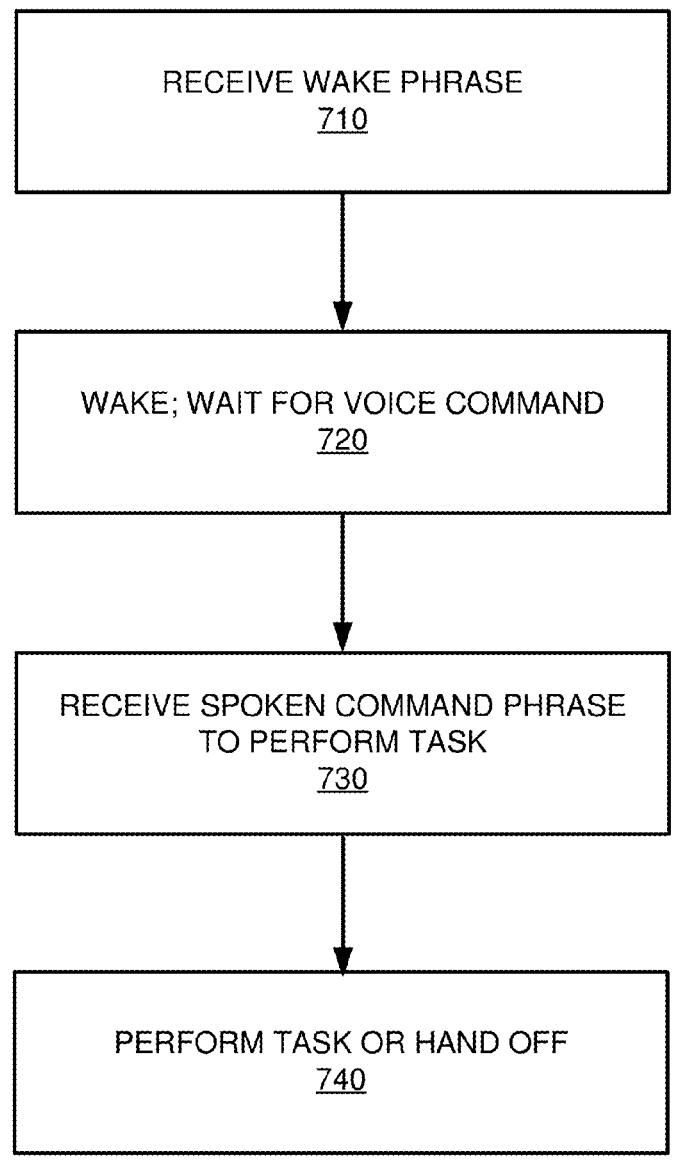
FIG. 7 is a flowchart of another example method of controlling which device out of a topology of interconnected electronic devices performs a recognized task.

FIG. 7 is a flowchart of another example method 700 of controlling which device out of a topology of interconnected electronic devices performs a recognized task.

At 710, a wake phrase is received and recognized.

At 720, the receiving device wakes and waits for a voice command.

At 730, a spoken command phrase to perform a task is received. The task can be recognized as described herein. If the command phrase includes a task and a device, the specified device can be awoken, and the command handed off to the specified device. If the command phrase has a device only, the device can be awoken. A task can then be received and recognized.

At 740, the recognized task is performed, or a handoff is performed as described herein. If the task cannot be performed, an error process can be invoked.

Example 55—Example Implementation—Device's Point of View

Figure 8:
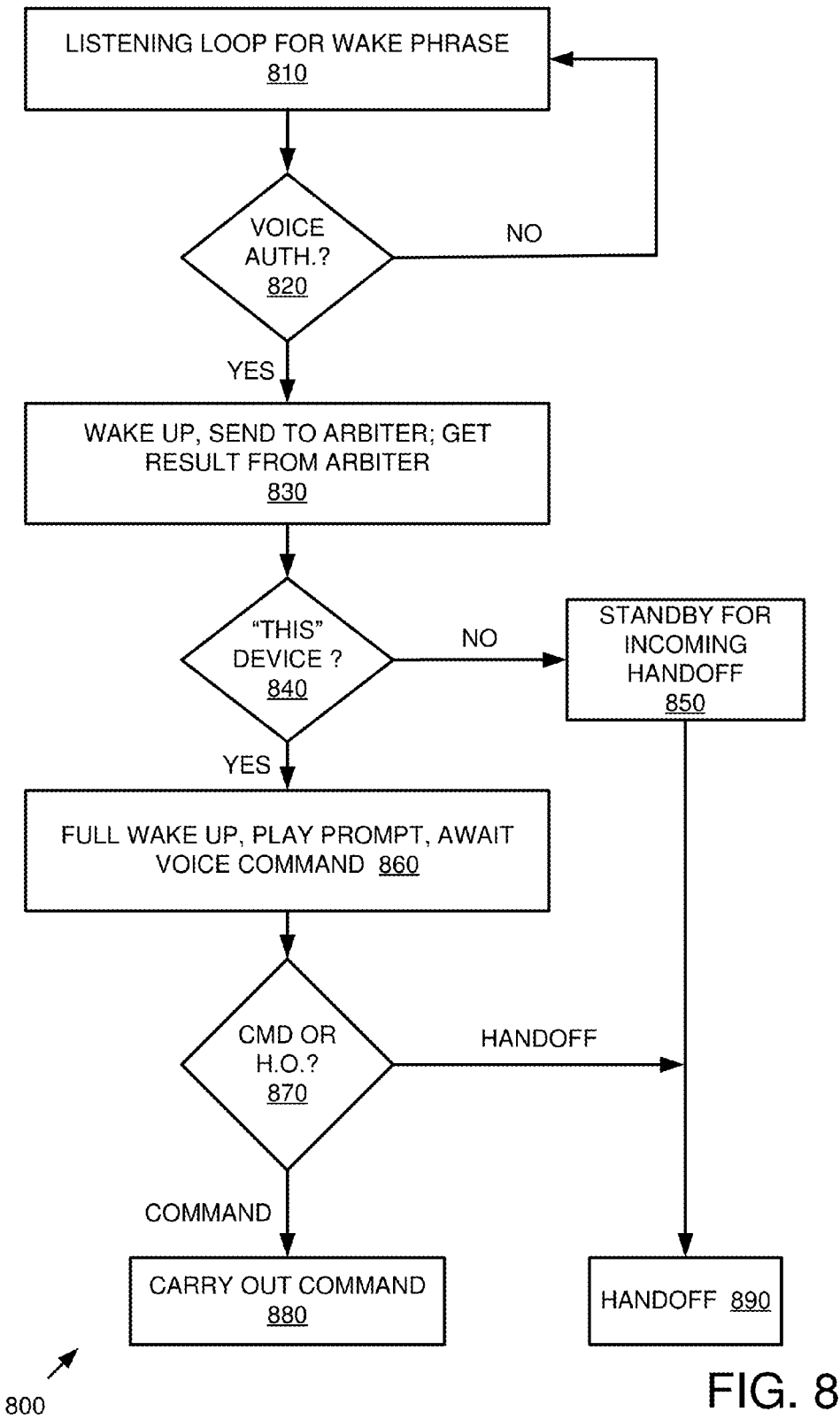
FIG. 8 is a flowchart of another example method of controlling which device out of a topology of interconnected electronic devices performs a recognized task from the perspective of a device.

FIG. 8 is a flowchart of another example method 800 of controlling which device out of a topology of interconnected electronic devices performs a recognized task and is described from the perspective of an electronic device.

At 810, the device is in a loop listening for the wake phrase. For example, the device can be in a standby, low-power state as described herein. If an authenticated voice is not detected 820, it can continue to loop.

Upon detection of an authenticated voice, the device can wake up, interact with the arbiter, and get a result from the arbiter 830.

If the device receives information that it is the right device at 840, it can proceed to a full wake up, play an audio prompt and await a voice command at 860. If not, it can standby for an incoming handoff at 850 (e.g., in case a handoff comes in).

At 870 it can be determined whether the command can be carried out, or if a handoff is warranted. At 880, if the command can be carried out, it is. Otherwise, an error process can be invoked.

If the command cannot be carried out by the processing device, it can handoff at 890.

Example 56—Example Implementation—System's Point of View

Figure 9:
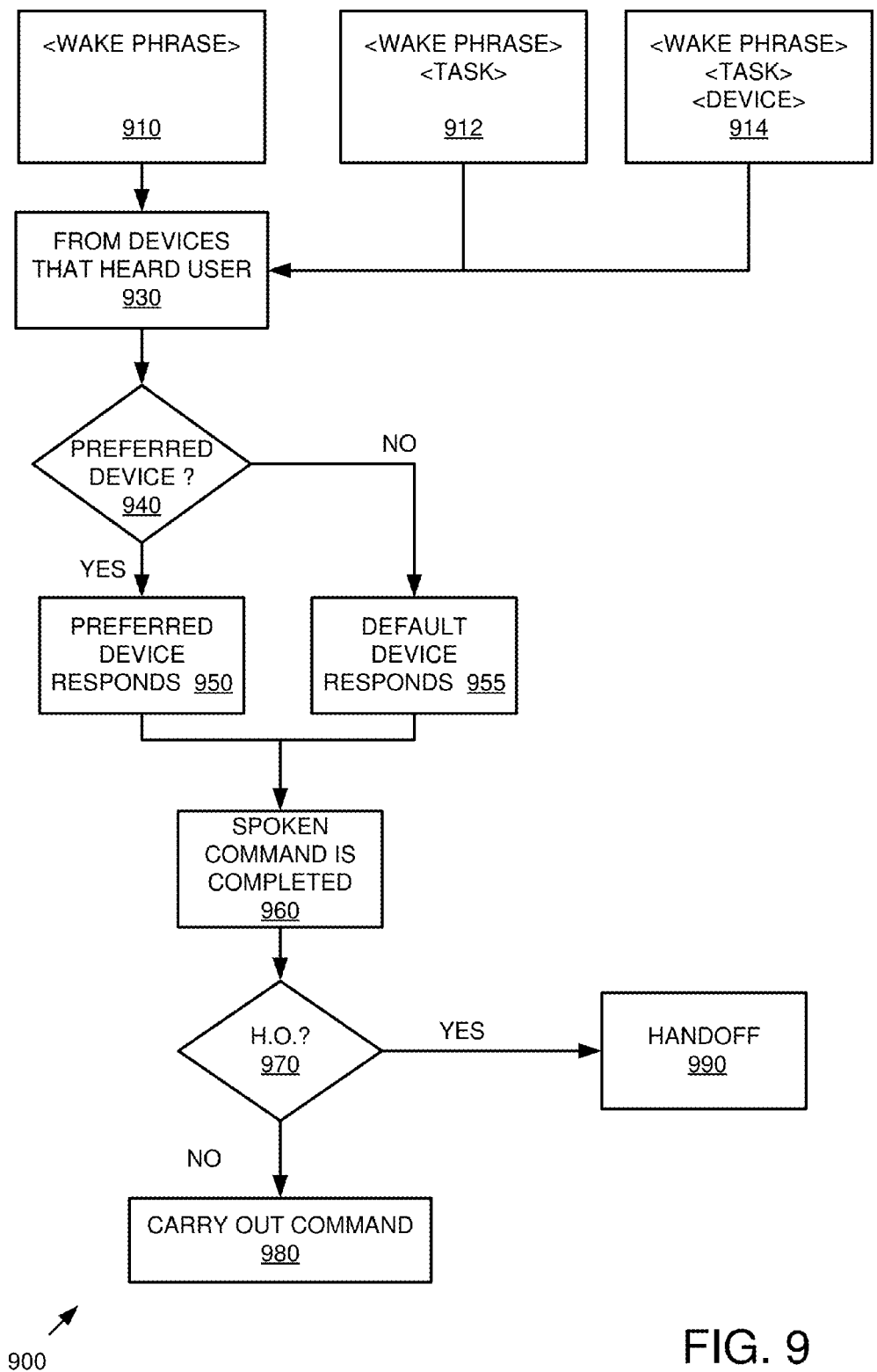
FIG. 9 is a flowchart of another example method of controlling which device out of a topology of interconnected electronic devices performs a recognized task from the perspective of an overall system.

FIG. 9 is a flowchart of another example method 900 of controlling which device out of a topology of interconnected electronic devices performs a recognized task from the perspective of an overall system.

The system can receive a wake phrase 910, wake phrase and a command phrase comprising a task 912, or a wake phrase and a command phrase comprising a task and a device 914. The devices that heard the user 930 can perform the initial processing to determine whether they should respond. At 940, if a preferred device is available (e.g., recognized the wake phrase), it can respond 950. If there is no preferred device available, a default device can respond 955.

The spoken command can then be completed 960 and recognized.

If a handoff is indicated at 970, then a handoff can be performed at 990. Such a handoff can be to the explicitly specified device, to the preferred device for the scenario (e.g., task), or to the default device for the scenario (e.g., task). Errors during handoff can be processed accordingly.

Otherwise, the command is carried out at 980. An error process can be invoked if the command cannot be carried out.

Example 57—Example Action when not One Preferred Device Available

When no preferred devices are available in the pool, (e.g., they are out of range, out of power, not logged in, not responding, etc.), the system can resort to a default device.

When more than one preferred device is available, the system can choose one (e.g., disambiguate) according to the default device list.

Phones can be the default device by default (e.g., when the telephone is purchased) if user expectations are in line with such a default.

Example 58—Example Default Device and Fallback List

The default device and fallback list can be as follows (e.g., in order): Preferred device; the device that is currently active; the device that was most recently used; resort to service provider defaults; wearable; phone; tablet; laptop; game console; desktop. Such rules of succession can be used when a preferred device is not available or able to perform a requested task.

Responsive to detecting a tie between devices at any layer, the system can choose the device one that is most recently used. Alternatively, the most frequently used device can be chosen. Ties between devices can be resolved cooperatively. For example, a first requesting device can assert itself and see if any other device objects. Thus, timeouts can be used to resolve fallback ties.

If this list had to be resorted due to multiple preferred devices for this user, the system can prompt the user to reconcile conflicts or ambiguities.

Example 59—Example Further Features

The system can make provision to make the system smarter. For instance, a metric of most actively used can be implemented for device defaults, fallbacks, and the like.

Personalization and machine learning can be used to deduce the default and preferred devices.

Example 60—Example Computing Systems

Figure 10:
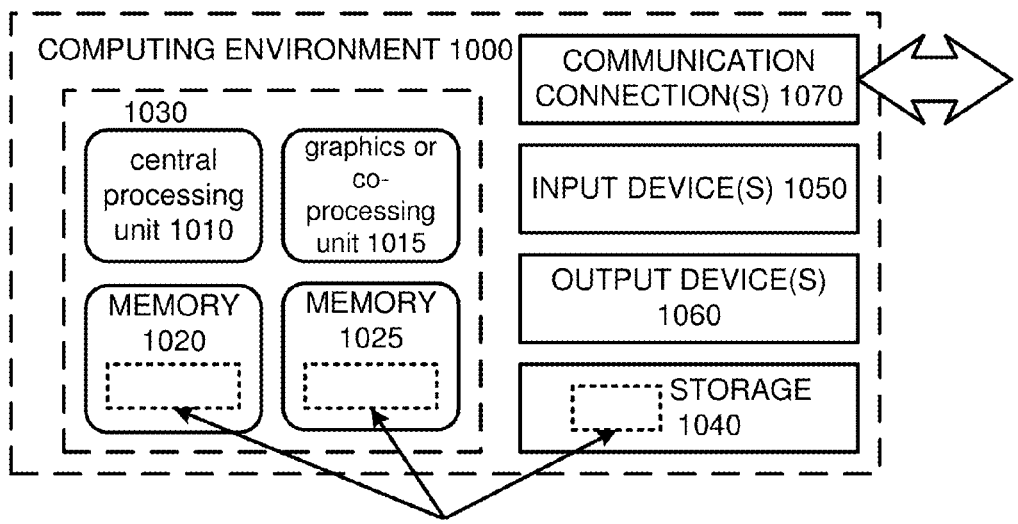
FIG. 10 is a diagram of an example computing system in which some described embodiments can be implemented.

FIG. 10 illustrates a generalized example of a suitable computing system or environment 1000 in which several of the described innovations may be implemented. The computing system 1000 is not intended to suggest any limitation as to scope of use or functionality, as the innovations may be implemented in diverse general-purpose or special-purpose computing systems. A mobile device, wearable device, or other devices as described herein can take the form of the described computing system 1000.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 can store software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 can store instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 1000, computer-readable media include memory 1020, 1025, storage 1040, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 61—Example Mobile Device

Figure 11:
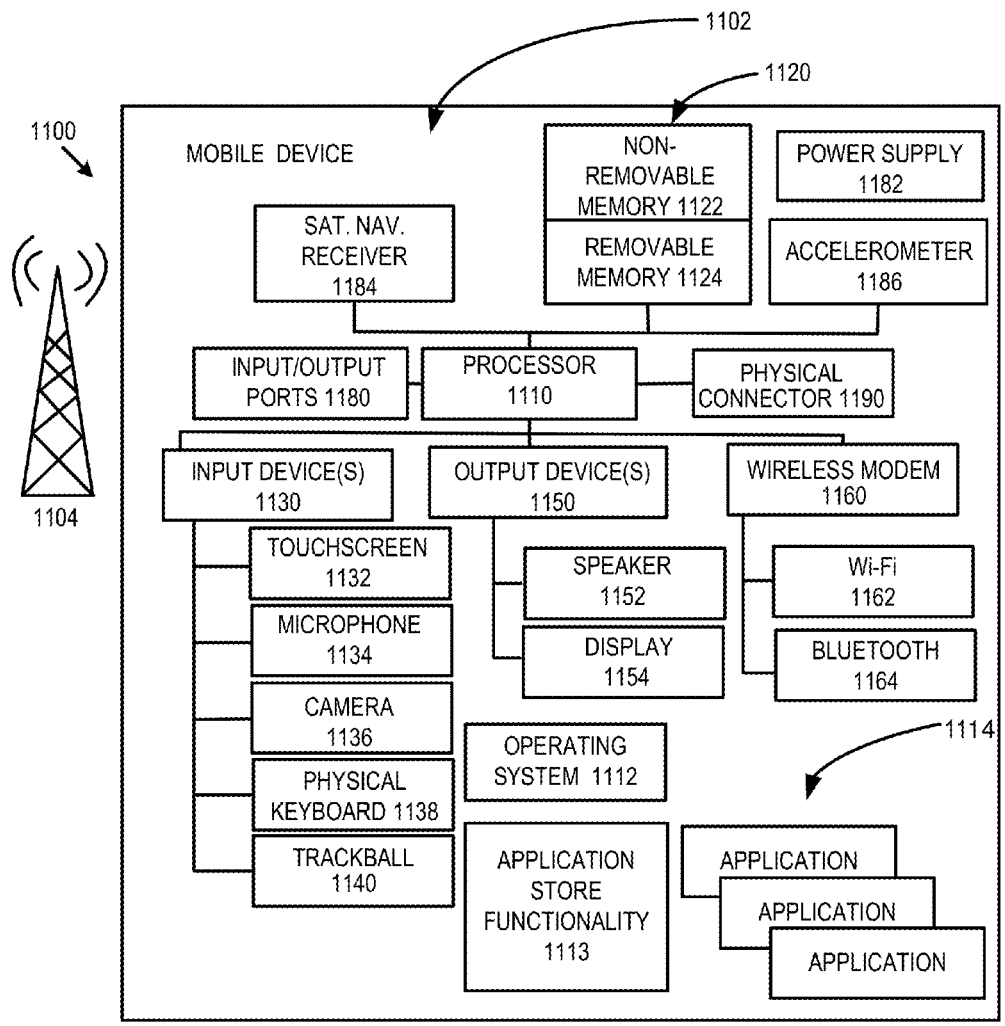
FIG. 11 is an example mobile device that can be used for the technologies described herein.

In any of the examples herein, a device can take the form of a mobile device. FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of mobile computing devices (e.g., cell phone, smartphone, tablet, handheld computer, drone, Personal Digital Assistant (PDA), etc.) and can allow wireless two-way communications with one or more mobile communications networks 1104, such as a cellular, satellite, or other network. Voice over IP scenarios (e.g., over Wi-Fi or other network) can also be supported. The communication devices described herein can take the form of the described mobile device 1100.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs 1114 can include common mobile computing applications (e.g., email applications, calendars, contact managers, web browsers, messaging applications), or any other computing application. Functionality 1113 for accessing an application store can also be used for acquiring and updating applications 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touch screen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM or CDMA network for data and voice communications within a single cellular network, between cellular networks, or between the mobile device and a public switched telephone network (PSTN).

The mobile device 1100 can further include at least one input/output port 1180, a power supply 1182, a satellite navigation system receiver 1184, such as a Global Navigation Satellite System (GNSS) (e.g., Global Positioning System or GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Example 62—Example Cloud-Supported Environment

Figure 12:
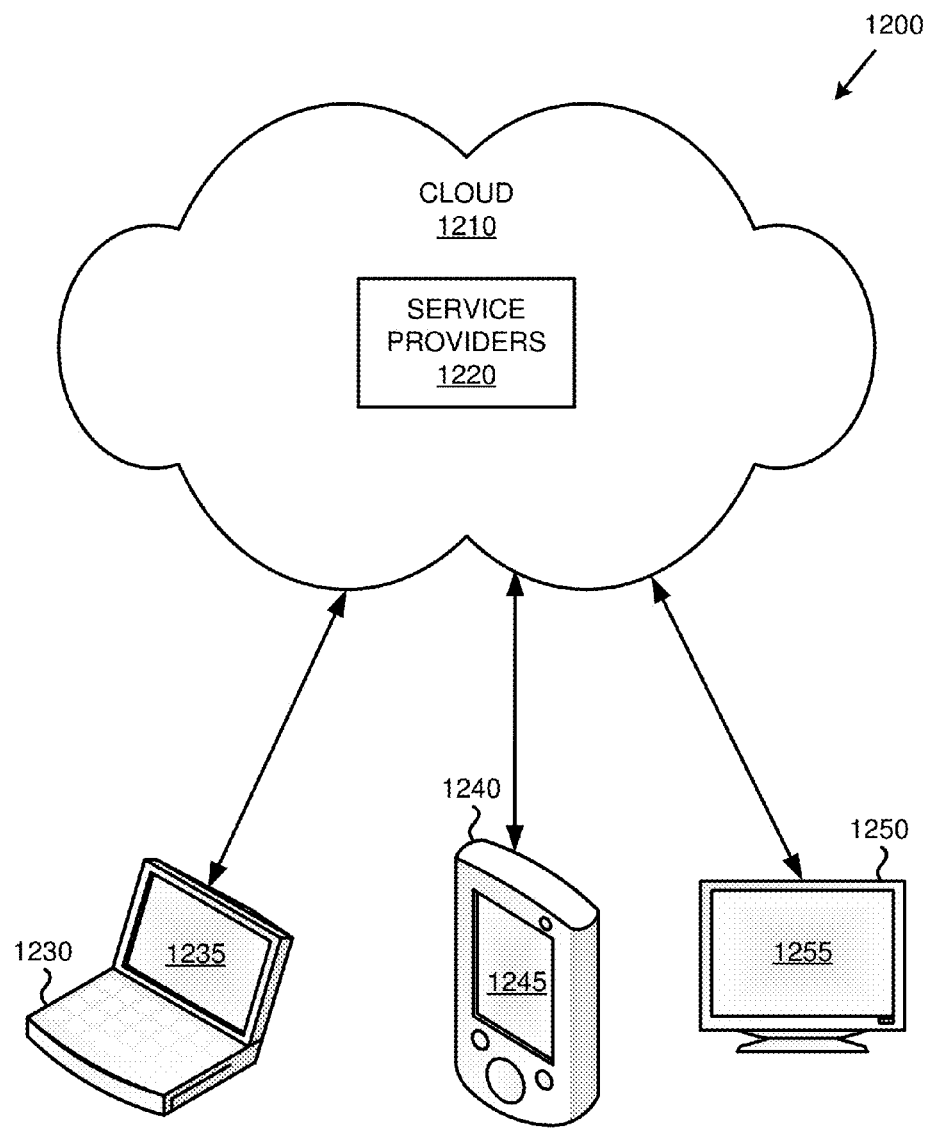
FIG. 12 is an example cloud-support environment that can be used in conjunction with the technologies described herein.

In example environment 1200 of FIG. 12, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like. Connected device 1250 represents a device with a large screen 1255. For example, connected device 1250 could be a television screen (e.g., a smart television) or another device connected to a television (e.g., a set-top box or gaming console) or the like. One or more of the connected devices 1230, 1240, 1250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Example 63—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Other Embodiments

Clause 1. A method of controlling which electronic device out of topology of interconnected electronic devices responds to a wake phrase, the method comprising:
in an electronic device of the topology of interconnected electronic devices configured to listen for voice commands, receiving a wake phrase from a microphone of the electronic device;
recognizing the wake phrase; and
responsive to recognizing the wake phrase, waking the electronic device and controlling which one electronic device out of the topology of interconnected electronic devices plays an audio prompt that indicates an active listening state in response to the wake phrase, wherein the controlling invokes response arbitration rules selecting a single electronic device out of the topology of interconnected electronic devices according to a user preference indicating a primary device designation for the interconnected electronic devices or recorded activity detected by one or more hardware sensors of the electronic device.

Clause 2. The method of clause 1 wherein:
the response arbitration rules specify rules of succession for devices when a primary device is not available.

Clause 3. The method of any of clauses 1-2 wherein:
the recorded activity indicates physical activity near or at the electronic device; and
the controlling chooses an electronic device having most recent physical activity.

Clause 4. The method of clause 3 wherein:
the electronic device having most recent physical activity is chosen in response to determining that a primary device is not available.

Clause 5. The method of any of clauses 1-4 wherein:
the controlling action chooses an electronic device designated as a primary device by the user preference.

Clause 6. The method of any of clauses 1-4 further comprising:
determining whether the wake phrase was spoken by an authorized user;
the wake phrase is not recognized when not spoken by an authorized user.

Clause 7. The method of any of clauses 1-6 wherein:
the recognizing is performed by an auxiliary processor of the electronic device while the electronic device is in a standby state.

Clause 8. The method of clause 7 wherein:
the controlling is performed by a main processor of the electronic device after the electronic device has transitioned out of the standby state; and
the electronic device consumes less power when in the standby state.

Clause 9. The method of clause 8 wherein:
waking the electronic device activates the main processor from an inactive state.

Clause 10. The method of any of clauses 1-9 further comprising:
receiving a voice command with the microphone of the electronic device;
recognizing a task in the voice command received with the microphone; and
responsive to recognizing the task, controlling which one electronic device out of the topology of interconnected electronic devices performs the recognized task, wherein the controlling invokes task arbitration rules selecting a single electronic device out of the topology of interconnected electronic devices according to user device preference or stored capabilities of the interconnected electronic devices.

Clause 11. The method of clause 10 wherein:
the task arbitration rules specify rules of succession for devices when a preferred device for the task is not available.

Clause 12. The method of any of clauses 10-11 further comprising:
recognizing repeated, consistent usage of a particular device for a particular task;
setting the user preference to indicate the particular device as associated with the particular task before listening;
wherein the recognized task comprises the particular task, and controlling which one electronic device performs the task comprises choosing the particular device for the particular task based on the user preference.

Clause 13. The method of any of clauses 10-12 further comprising:
determining via the stored capabilities of the interconnected electronic devices that the recognized task is not performable at the electronic device; and
selecting an other electronic device to perform the recognized task.

Clause 14. The method of claim 13 further comprising:
handing the recognized task off to an other electronic device.

Clause 15. The method of any of clauses 13-14 further comprising:
sending a wake command to the other electronic device.

Clause 16. The method of any of clauses 13-15 wherein:
the selected single electronic device did not hear the voice command.

Clause 17. An electronic device configured to recognize a wake phrase when in a low-power standby state in an environment comprising a topology of interconnected electronic devices, the electronic device comprising:
a plurality of hardware sensors comprising a microphone;
a speaker;
a stored preference indicating a primary device designation for the topology of interconnected electronic devices; and
a stored device listening state, wherein the stored device listening state transitions from the low-power standby state upon recognition of the wake phrase as received by the microphone, and wherein the electronic device is configured to control which one electronic device out of the topology of interconnected electronic devices transitions to an active listening state and plays an audio prompt that indicates the active listening state in response to the wake phrase according to the stored preference indicating the primary device designation for the interconnected electronic devices or recorded activity detected by one or more of the hardware sensors of the electronic device.

Clause 18. The electronic device of clause 17 wherein the electronic device further comprises:
an auxiliary voice recognition subsystem configured to recognize the wake phrase and transition the electronic device out of the low-power standby state; and
a main voice recognition subsystem configured to control which one electronic device out of the topology of interconnected electronic devices transitions to an active listening state.

Clause 19. The electronic device of any of clauses 17-18 further comprising:
a voice recognizer configured to recognize a voice command received by the microphone of the electronic device, wherein the voice command comprises a task;
a task arbiter configured to control which one electronic device out of the topology of interconnected electronic devices performs the task according to user preference or capabilities of the interconnected electronic devices.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method of controlling which electronic device out of a topology of interconnected electronic devices responds to a wake phrase, the method comprising:
in an electronic device of the topology of interconnected electronic devices configured to listen for voice commands, receiving a wake phrase from a microphone of the electronic device;
recognizing the wake phrase; and
responsive to recognizing the wake phrase, waking the electronic device and controlling which one electronic device out of the topology of interconnected electronic devices plays an audio prompt that indicates an active listening state in response to the wake phrase, wherein the controlling invokes response arbitration rules selecting a single electronic device out of the topology of interconnected electronic devices as a primary device, wherein selection of the primary device is based on a determination that the single electronic device has been used most recently, of the interconnected electronic devices, prior to the wake phrase being received from the microphone, wherein the determination is based on recorded activity indicating physical activity near or at the electronic device.

2. The method of claim 1 wherein:
the response arbitration rules specify rules of succession for devices when a primary device is not available, the rules of succession indicating a fallback list of alternative devices.

3. The method of claim 2 wherein
an electronic device is designated as a device on the fallback list of alternative devices based on the frequency of usage.

4. The method of claim 1 wherein:
an electronic device having a second most recent physical activity prior to receipt of the wake phrase is chosen in response to determining that the primary device is not available.

5. The method of claim 1 further comprising:
determining whether the wake phrase was spoken by an authorized user, wherein the wake phrase is not recognized when not spoken by an authorized user.

6. The method of claim 1 wherein:
the recognizing is performed by an auxiliary processor of the electronic device while the electronic device is in a standby state.

7. The method of claim 6 wherein:
the controlling is performed by a main processor of the electronic device after the electronic device has transitioned out of the standby state; and
the electronic device consumes less power when in the standby state.

8. The method of claim 7 wherein:
waking the electronic device activates the main processor from an inactive state.

9. The method of claim 1 further comprising:
receiving a voice command with the microphone of the electronic device;
recognizing a task in the voice command received with the microphone; and
responsive to recognizing the task, controlling which one electronic device out of the topology of interconnected electronic devices performs the recognized task, wherein the controlling invokes task arbitration rules selecting a single electronic device out of the topology of interconnected electronic devices according to user device preference or stored capabilities of the interconnected electronic devices.

10. The method of claim 9 wherein:
the task arbitration rules specify rules of succession for devices when a preferred device for the task is not available.

11. The method of claim 9 further comprising:
recognizing repeated, consistent usage of a particular device for a particular task;
setting the user preference to indicate the particular device as associated with the particular task before listening;
wherein the recognized task comprises the particular task, and controlling which one electronic device performs the task comprises choosing the particular device for the particular task based on the user preference.

12. The method of claim 9 further comprising:
determining via the stored capabilities of the interconnected electronic devices that the recognized task is not performable at the electronic device; and
selecting an other electronic device to perform the recognized task.

13. The method of claim 12 further comprising:
handing the recognized task off to an other electronic device.

14. The method of claim 12 further comprising:
sending a wake command to the other electronic device.

15. The method of claim 12 wherein:
the selected single electronic device did not hear the voice command.

16. An electronic device configured to recognize a wake phrase when in a low-power standby state in an environment comprising a topology of interconnected electronic devices, the electronic device comprising:
a plurality of hardware sensors comprising a microphone;
a speaker; and
a stored device listening state, wherein the stored device listening state transitions from the low-power standby state upon recognition of the wake phrase as received by the microphone, and wherein the electronic device is configured to control which one electronic device out of the topology of interconnected electronic devices transitions to an active listening state and plays an audio prompt that indicates the active listening state in response to the wake phrase according to an electronic device, of the interconnected electronic devices, being used most recently prior to the wake phrase being received by the microphone, wherein the electronic device being used most recently is determined based on recorded activity indicating physical activity near or at the electronic device.

17. The electronic device of claim 16 wherein the electronic device further comprises:
an auxiliary voice recognition subsystem configured to recognize the wake phrase and transition the electronic device out of the low-power standby state; and
a main voice recognition subsystem configured to control which one electronic device out of the topology of interconnected electronic devices transitions to an active listening state.

18. The electronic device of claim 16 further comprising:
a voice recognizer configured to recognize a voice command received by the microphone of the electronic device, wherein the voice command comprises a task; and
a task arbiter configured to control which one electronic device out of the topology of interconnected electronic devices performs the task according to user preference or capabilities of the interconnected electronic devices.

19. At least one computer memory containing machine-executable instructions causing an electronic device to perform a method controlling which electronic device out of topology of interconnected electronic devices responds to a wake phrase, the method comprising:
receiving a wake phrase of a virtual persona from a microphone of the electronic device;
recognizing the wake phrase of the virtual persona in the electronic device;
responsive to recognizing the wake phrase of the virtual persona, waking the electronic device and controlling which one electronic device out of the topology of interconnected electronic devices plays an audio prompt that indicates a listening state in response to the wake phrase, wherein the controlling invokes arbitration rules selecting a single device out of the topology of interconnected electronic devices when a user preference indicating a primary device designation for the interconnected electronic devices indicates a primary device that is not available, wherein the single device is determined to be a device used most recently prior to receiving the wake phrase based on recorded activity representing physical activity near or at the single device, wherein the single device is different from the electronic device;
receiving a command phrase from the microphone of the electronic device;
recognizing a task in the command phrase;
via a timeout, determining that a preferred device for the task is not available;

responsive to determining that a preferred device for the task is not available, determining a fallback device for the task; and handing the task off to the fallback device.

* * * * *